(12) United States Patent
De Groot

(10) Patent No.: US 7,522,288 B2
(45) Date of Patent: Apr. 21, 2009

(54) COMPENSATION OF SYSTEMATIC EFFECTS IN LOW COHERENCE INTERFEROMETRY

(75) Inventor: Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 11/780,177

(22) Filed: Jul. 19, 2007

(65) Prior Publication Data

US 2008/0018901 A1 Jan. 24, 2008

Related U.S. Application Data

(60) Provisional application No. 60/832,452, filed on Jul. 21, 2006.

(51) Int. Cl.
*G01B 11/02* (2006.01)

(52) U.S. Cl. .................................. 356/511; 356/497

(58) Field of Classification Search .............. 356/497, 356/450, 511
See application file for complete search history.

(56) References Cited

U.S. PATENT DOCUMENTS

| | | | |
|---|---|---|---|
| 2,612,074 A | 9/1952 | Mirau | |
| 4,188,122 A | 2/1980 | Massie et al. | |
| 4,199,219 A | 4/1980 | Suzuki et al. | |
| 4,340,306 A | 7/1982 | Balasubramanian | |
| 4,355,903 A | 10/1982 | Sandercock | |
| 4,523,846 A | 6/1985 | Breckinridge et al. | |
| 4,576,479 A | 3/1986 | Downs | |
| 4,583,858 A | 4/1986 | Lebling et al. | |
| 4,618,262 A | 10/1986 | Maydan et al. | |
| 4,639,139 A | 1/1987 | Wyant et al. | |
| 4,660,980 A | 4/1987 | Takabayashi et al. | |
| 4,710,642 A | 12/1987 | McNeil | |
| 4,806,018 A | 2/1989 | Falk | |
| 4,818,110 A | 4/1989 | Davidson | |
| 4,869,593 A | 9/1989 | Biegen | |
| 4,923,301 A | 5/1990 | White | |
| 4,948,253 A | 8/1990 | Biegen | |
| 4,964,726 A | 10/1990 | Kleinknecht et al. | |
| 4,999,014 A | 3/1991 | Gold et al. | |

(Continued)

FOREIGN PATENT DOCUMENTS

DE    4108944    9/1992

(Continued)

OTHER PUBLICATIONS

US 7,151,607, 12/2008, De Groot (withdrawn).

(Continued)

*Primary Examiner*—Tarifur Chowdhury
*Assistant Examiner*—Michael Lapage
(74) *Attorney, Agent, or Firm*—Fish & Richardson P.C.

(57) ABSTRACT

In general, in one aspect, the invention features a method that includes transforming interferometry data acquired for a test sample using a low coherence imaging interferometry system to a frequency domain and, at a plurality of frequencies in the frequency domain, reducing contributions to the transformed interferometry data due to imperfections in the imaging interferometry system thereby producing compensated interferometry data. The errors are reduced based on variations between interferometry data acquired using the low coherence imaging interferometry system for a calibration sample and model interferometry data corresponding to data acquired for the calibration sample using a model interferometry system.

38 Claims, 21 Drawing Sheets

U.S. PATENT DOCUMENTS

| | | |
|---|---|---|
| 5,042,949 A | 8/1991 | Greenberg et al. |
| 5,042,951 A | 8/1991 | Gold et al. |
| 5,073,018 A | 12/1991 | Kind et al. |
| 5,112,129 A | 5/1992 | Davidson et al. |
| 5,129,724 A | 7/1992 | Brophy et al. |
| 5,133,601 A | 7/1992 | Cohen et al. |
| 5,135,307 A | 8/1992 | De Groot et al. |
| 5,153,669 A | 10/1992 | DeGroot |
| 5,164,790 A | 11/1992 | McNeil et al. |
| 5,166,751 A | 11/1992 | Massig |
| 5,173,746 A | 12/1992 | Brophy |
| 5,194,918 A | 3/1993 | Kino et al. |
| 5,241,369 A | 8/1993 | McNeil et al. |
| 5,301,010 A | 4/1994 | Jones et al. |
| 5,355,221 A | 10/1994 | Cohen et al. |
| 5,384,717 A | 1/1995 | Ebenstein |
| 5,386,119 A | 1/1995 | Ledger |
| 5,390,023 A | 2/1995 | Biegen |
| 5,398,113 A | 3/1995 | De Groot |
| 5,402,234 A | 3/1995 | Deck |
| 5,459,564 A | 10/1995 | Chivers |
| 5,471,303 A | 11/1995 | Ai et al. |
| 5,481,811 A | 1/1996 | Smith |
| 5,483,064 A | 1/1996 | Frey et al. |
| 5,539,517 A | 7/1996 | Cabib et al. |
| 5,543,841 A | 8/1996 | Kanamori |
| 5,555,471 A | 9/1996 | Xu et al. |
| 5,587,792 A | 12/1996 | Nishizawa et al. |
| 5,589,938 A | 12/1996 | Deck |
| 5,602,643 A | 2/1997 | Barrett |
| 5,633,714 A | 5/1997 | Nyyssonen |
| 5,640,270 A | 6/1997 | Aziz et al. |
| 5,703,692 A | 12/1997 | McNeil et al. |
| 5,757,502 A | 5/1998 | Weling |
| 5,774,224 A | 6/1998 | Kerstens |
| 5,777,740 A | 7/1998 | Lacey et al. |
| 5,777,742 A | 7/1998 | Marron |
| 5,784,164 A | 7/1998 | Deck et al. |
| 5,856,871 A | 1/1999 | Cabib et al. |
| 5,867,276 A | 2/1999 | McNeil et al. |
| 5,880,838 A | 3/1999 | Marx et al. |
| 5,900,633 A | 5/1999 | Solomon et al. |
| 5,912,741 A | 6/1999 | Carter et al. |
| 5,923,423 A | 7/1999 | Sawarti et al. |
| 5,953,124 A | 9/1999 | Deck |
| 5,956,141 A | 9/1999 | Hayashi |
| 5,963,329 A | 10/1999 | Conrad et al. |
| 6,028,670 A | 2/2000 | Deck |
| 6,160,621 A | 12/2000 | Perry et al. |
| 6,242,739 B1 | 6/2001 | Cherkassky |
| 6,249,351 B1 | 6/2001 | De Groot |
| 6,259,521 B1 | 7/2001 | Miller et al. |
| 6,275,297 B1 | 8/2001 | Zalicki |
| 6,377,349 B1 | 4/2002 | Fercher |
| 6,381,009 B1 | 4/2002 | McGahan |
| 6,392,749 B1 | 5/2002 | Meeks et al. |
| 6,417,109 B1 | 7/2002 | Jordan et al. |
| 6,429,943 B1 | 8/2002 | Opsal et al. |
| 6,449,066 B1 | 9/2002 | Arns et al. |
| 6,483,580 B1 | 11/2002 | Xu et al. |
| 6,500,591 B1 | 12/2002 | Adams |
| 6,507,405 B1 | 1/2003 | Grek et al. |
| 6,545,761 B1 | 4/2003 | Aziz et al. |
| 6,545,763 B1 | 4/2003 | Kim et al. |
| 6,590,656 B2 | 7/2003 | Xu et al. |
| 6,597,460 B2 | 7/2003 | Groot et al. |
| 6,611,330 B2 | 8/2003 | Lee et al. |
| 6,624,894 B2 | 9/2003 | Olszak et al. |
| 6,633,389 B1 | 10/2003 | Poris et al. |
| 6,633,831 B2 | 10/2003 | Nikoonahad et al. |
| 6,636,322 B1 | 10/2003 | Terashita |
| 6,694,284 B1 | 2/2004 | Nikoonahad et al. |
| 6,714,307 B2 | 3/2004 | De Groot et al. |
| 6,721,094 B1 | 4/2004 | Sinclair et al. |
| 6,741,357 B2 | 5/2004 | Wang et al. |
| 6,741,360 B2 | 5/2004 | D'Agraives et al. |
| 6,775,006 B2 | 8/2004 | De Groot et al. |
| 6,775,009 B2 | 8/2004 | Hill |
| 6,798,511 B1 | 9/2004 | Zhan et al. |
| 6,822,745 B2 | 11/2004 | De Groot et al. |
| 6,856,384 B1 | 2/2005 | Rovira |
| 6,888,638 B1 | 5/2005 | Hill |
| 6,891,627 B1 | 5/2005 | Levy et al. |
| 6,909,509 B2 | 6/2005 | De Groot |
| 6,925,860 B1 | 8/2005 | Poris et al. |
| 6,940,604 B2 | 9/2005 | Jung et al. |
| 6,956,658 B2 | 10/2005 | Meeks et al. |
| 6,956,660 B2 | 10/2005 | Meeks et al. |
| 6,985,232 B2 | 1/2006 | Sezginer |
| 6,989,905 B2 | 1/2006 | De Groot |
| 6,999,180 B1 | 2/2006 | Janik et al. |
| 7,012,700 B2 | 3/2006 | de Groot et al. |
| 7,018,271 B2 | 3/2006 | Wiswesser et al. |
| 7,046,371 B2 | 5/2006 | De Lega et al. |
| 7,061,623 B2 | 6/2006 | Davidson |
| 7,068,376 B2 | 6/2006 | De Groot |
| 7,088,451 B2 | 8/2006 | Sezginer |
| 7,102,761 B2 | 9/2006 | De Lega et al. |
| 7,106,454 B2 | 9/2006 | De Groot et al. |
| 7,119,909 B2 | 10/2006 | Unruh et al. |
| 7,139,081 B2 | 11/2006 | De Groot |
| 7,139,083 B2 | 11/2006 | Fielden et al. |
| 7,142,311 B2 | 11/2006 | De Lega |
| 7,177,030 B2 | 2/2007 | Leizerson |
| 7,239,398 B2 | 7/2007 | De Groot et al. |
| 7,271,918 B2 | 9/2007 | De Groot et al. |
| 7,283,248 B2 | 10/2007 | Hill |
| 7,289,225 B2 | 10/2007 | De Groot |
| 7,298,494 B2 | 11/2007 | De Groot |
| 7,304,747 B2 | 12/2007 | De Lega |
| 7,315,382 B2 | 1/2008 | De Groot |
| 7,324,210 B2 | 1/2008 | De Groot et al. |
| 7,324,214 B2 | 1/2008 | De Groot et al. |
| 2002/0015146 A1 | 2/2002 | Meeks et al. |
| 2002/0135775 A1 | 9/2002 | De Groot et al. |
| 2002/0196450 A1 | 12/2002 | Olszak et al. |
| 2003/0011784 A1 | 1/2003 | de Groot et al. |
| 2003/0048458 A1 | 3/2003 | Mieher et al. |
| 2003/0075721 A1 | 4/2003 | Li |
| 2003/0112444 A1 | 6/2003 | Yang et al. |
| 2003/0137671 A1 | 7/2003 | De Groot et al. |
| 2003/0197871 A1 | 10/2003 | De Groot |
| 2004/0027576 A1 | 2/2004 | De Groot et al. |
| 2004/0075843 A1 | 4/2004 | Marron et al. |
| 2004/0085544 A1 | 5/2004 | De Groot et al. |
| 2004/0185582 A1 | 9/2004 | Kueny |
| 2004/0189999 A1* | 9/2004 | De Groot et al. ............ 356/497 |
| 2004/0233442 A1 | 11/2004 | Mieher et al. |
| 2004/0233444 A1 | 11/2004 | Mieher et al. |
| 2004/0246493 A1 | 12/2004 | Kim et al. |
| 2005/0057757 A1 | 3/2005 | Colonna de Lega et al. |
| 2005/0068540 A1 | 3/2005 | De Groot et al. |
| 2005/0073692 A1 | 4/2005 | De Groot et al. |
| 2005/0078318 A1 | 4/2005 | De Groot |
| 2005/0078319 A1 | 4/2005 | De Groot |
| 2005/0088663 A1* | 4/2005 | De Groot et al. ............ 356/497 |
| 2005/0146727 A1 | 7/2005 | Hill |
| 2005/0179911 A1 | 8/2005 | Boomgarden et al. |
| 2005/0225769 A1 | 10/2005 | Bankhead et al. |
| 2005/0237534 A1 | 10/2005 | Deck |
| 2005/0237537 A1 | 10/2005 | Leizerson et al. |
| 2006/0012582 A1 | 1/2006 | De Lega |
| 2006/0119841 A1 | 6/2006 | Saunders et al. |
| 2006/0158657 A1 | 7/2006 | De Lega et al. |

| | | | |
|---|---|---|---|
| 2006/0158658 A1 | 7/2006 | Colonna de Lega et al. |
| 2006/0158659 A1 | 7/2006 | Colonna de Lega et al. |
| 2006/0187465 A1 | 8/2006 | De Groot |
| 2006/0262321 A1 | 11/2006 | De Groot |
| 2007/0008551 A1 | 1/2007 | Tang |
| 2007/0046953 A1 | 3/2007 | de Groot et al. |
| 2007/0081167 A1 | 4/2007 | De Groot |
| 2007/0086013 A1 | 4/2007 | De Lega et al. |
| 2007/0091317 A1 | 4/2007 | Freischlad et al. |
| 2007/0091318 A1 | 4/2007 | Freischlad et al. |
| 2007/0097380 A1 | 5/2007 | De Groot et al. |
| 2007/0127036 A1 | 6/2007 | Liao et al. |
| 2007/0139656 A1 | 6/2007 | Wan |
| 2007/0247637 A1 | 10/2007 | De Groot |
| 2008/0018901 A1 | 1/2008 | de Groot |
| 2008/0088849 A1 | 4/2008 | de Lega et al. |

FOREIGN PATENT DOCUMENTS

| | | |
|---|---|---|
| DE | 4309056 | 9/1994 |
| EP | 0 397 388 | 11/1990 |
| EP | 0 549 166 | 6/1993 |
| EP | 0 617 255 | 9/1994 |
| EP | 0 929 094 | 7/1999 |
| GB | 2385417 | 8/2003 |
| JP | 8327327 | 12/1996 |
| JP | 2000121317 | 4/2000 |
| KR | 20000061037 | 10/2000 |
| WO | WO 93/24805 | 12/1993 |
| WO | WO 95/09343 | 4/1995 |
| WO | WO 97/44633 | 11/1997 |
| WO | WO 02/082008 | 10/2002 |
| WO | WO 03/036229 | 5/2003 |
| WO | WO 03/062802 | 7/2003 |
| WO | WO 2004/023071 | 3/2004 |
| WO | WO 2005/029192 | 3/2005 |

OTHER PUBLICATIONS

Abdulhalim, "Spectroscopic interference microscopy technique for measurement of layer parameters", Meas. Sci. Technol., vol. 12, pp. 1996-2001 (2001).

Akcay et al., "Spectral shaping to improve the point spread function in optical coherence tomography", Optics Letters, vol. 28, No. 20, pp. 1921-1923 (Oct. 15, 2003).

Azzam et al, "Ellipsometric function of a film-substrate system: Applications to the design of reflection-type optical devices and to ellipsometry", Journal of the Optical Society of America, vol. 5, No. 3, pp. 252-260 (1975).

Azzam et al., "Reflection and Transmission of Polarized Light by Stratified Planar Structures" Ellipsometry and Polarized Light, Elsevier Science B.V. ISBN 0 444 87016 4 (Paperback) pp. 267-363 (1987).

Bashkansky et al., "Signal Processing for Improving Field Cross-correlation Function in Optical Coherence Tomography", Supplement to Optics & Photonics News, 9(5) (May 1998).

Berman et al., "Review of In Situ & In-line Detection for CMP Applications", Semiconductor Fabtech—8.sup.th Edition, pp. 267-274.

Biegen, "Determination of the Phase Change on Reflection from Two-beam Interference," Optics Letters, 19:21:1690-1692, Nov. 1, 1994.

Bishop, et al., "Grating line shape characterization using scatterometry," SPIE 1545, 64-73 (1991).

Bosseboeuf et al., Application of microscopic interferometry techniques in the MEMS field, Proc. SPIE, 5145, pp. 1-16 (2003). cited by other.

Chim, S. S. C. and Kino, G. S., "Three-Dimensional Image Realization in Interference Microscopy", Applied Optics, May 10, 1992, vol. 31, No. 14.

Creath, "Step height measurement using two-wavelength phase-shifting interferometry", Applied Optics, vol. 26, No. 14, pp. 2810-2816 (Jul. 15, 1987).

Danielson et al., "Absolute Optical Ranging Using Low Coherence Interferometry," Applied Optics, 30:21:2975-2979, Jul. 20, 1991.

Davidson et al., "An Application of Interference Microscopy to Integrated Circuit Inspection and Metrology", Proceedings of SPIE, vol. 775, pp. 233-247 (1987).

de Groot et al., "Angle-resolved three-dimensional analysis of surface films by coherence scanning interferometry", Optics Letters, vol. 32, No. 12, pp. 1638-1640 (Jun. 15, 2007).

de Groot et al., "Determination of fringe order in white-light interference microscopy", Appl. Opt., 41(22) pp. 4571-4578 (2002).

de Groot et al., "Signal modeling for low coherence height-scanning interference microscopy", Applied Optics, vol. 43 No. 25, pp. 4821-4830 (Sep. 1, 2004).

de Groot et al., "Signal modeling for modern interference microscopes", SPIE Proceedings vol. 5457, pp. 26-34 (2004).

de Groot et al.; "Three-dimensional imaging by sub-Nyquist sampling of white-light interfergrams"; Optics Letters vol. 18, No. 17; pp. 1462-1464, Sep. 1, 1993.

de Groot, "Extending the unambiguous range of two-color interferometers", Applied Optics, vol. 33, No. 25, pp. 5948-5953 (Sep. 1, 1994).

de Groot, "Derivation of algorithms for phase-shifting interferometry using the concept of a data-sampling window", Appl. Opt., 34(22), p. 4723-4730 (1995).

de Groot, "Three-color laser-diode interferometer", Applied Optics, vol. 30, No. 25, pp. 3612-3616 (Sep. 1, 1991).

de Groot, P., "Phase-shift calibration errors in interometers with spherical Fizeua cavities," Applied Optics, vol. 34:16, pp. 2856-2863 (Jun. 1, 1995).

de Lega, X., et al., "Optical topography measurement of patterned wafers," American Institute of Physics Conference Proceedings, vol. 788, pp. 432-436 (2005).

Debnath, S.K., et al., "Spectrally resolved phase-shifting interferometry of transparent thin films: sensitivity of thickness measurements," Appl. Opt. 45, 34 8636-8640 (2006).

Deck et al., "Two-color light-emitting-diode source for high-precision phase-shifting interferometry", Optics Letters, vol. 18, No. 22, pp. 1899-1901 (Nov. 15, 1993).

Dresel et al., "Three Dimensional Sensing of Rough Surfaces by Coherence Radar," Applied Optics, 31:7:919-925, Mar. 1, 1992.

Encyclopedia of Laser Physics and Technology, http:\\www.rp-photonics.com\coherence.html.

Encyclopedia of Laser Physics and Technology, http:\\www.rp-photonics.com\single mode fibers.html.

Encyclopedia of Laser Physics and Technology, http:\\www.rp-photonics.com\photonic crystal fibers.html.

Encyclopedia of Laser Physics and Technology, http:\\www.rp-photonics.com\supercontinuum generation.html.

Feke, Gilbert D. et al., "Interferometric back focal plane microellipsometry", Applied Optics, vol. 37, No. 10, pp. 1796-1802 (Apr. 1, 1998).

Flournoy et al., "White-light interferometric thickness gauge", Appl. Opt., 11(9), pp. 1907-1915 (1972).

Gale et al. "Linnik microscope imaging of integrated circuit structures" Applied Optics vol. 35, No. 1, pp. 131-148 (Jan. 1, 1996).

Ghiglia et al., "Quality-Guided Path Following" Two-Dimensional Phase Unwrapping—Theory, Algorithms and Software, John Wiley & Sons publishers, ISBN 0-471-24935-1, pp. 122-136 (1998).

Greivenkamp, "Generalized data reduction for heterodyne interferometry," Opt. Eng., vol. 23 No. 4, pp. 350-352 (Jul./Aug. 1984).

Hausler et al., "Coherence Radar and Spectral Radar—New Tools for Dermatological Diagnosis", Journal of Biomedical Optics, vol. 3, No. 1, pp. 21-31 (Jan. 1998).

Hecht, "Basics of Coherence Theory," Optics, 2nd Ed., Addison Wesley, pp. 516-517 (1987).

Holmes et al., "Scanning microellipsometry for extraction of true topography", Electronics Letters, vol. 31, No. 5, pp. 358-359 (Mar. 2, 1995).

Kim, Seung-Woo et al., "Thickness-profile measurement of transparent thin-film layers by white-light scanning interferometry", Applied Optics, vol. 38, No. 28, pp. 5968-5973 (Oct. 1, 1999).

Kino et al., "Mirau Correlation Microscope," Applied Optics, 29:26:3775-3783, Sep. 10, 1990.

Kleinknecht, et al., "Linewidth measurement on IC masks and wafers by grating test patterns," Appl. Opt. 19(4), 523-533 (1980).

Kohlhaas, A. Fromchen, C. and Brinkmeyer, E., "High-Resolution OCDR for Testing Integrated-Optical Waveguides: Dispersion-Corrupted Experimental Data Corrected by a Numerical Algorithm" Journal of Lightwave Technology, Nov. 1991, vol. 9, No. 11.

Kujawinska, Malgorzata, "Spatial Phase Measurement Methods", Interferogram Analysis: Digital Fringe Pattern Measurement Techniques, IOP Publishing Ltd. 1993, pp. 141-193.

Larkin, "Efficient nonlinear algorithm for envelope detection in white light interferometry", J. Opt. Soc. Am A4, pp. 832-843 (1996).

Lee et al., "Profilometry with a coherence scanning microscope", Appl. Opt., 29(26), pp. 3784-3788 (1990).

Lee-Bennett, "Advances in non-contacting surface metrology", OF&T Workshop, paper OTuC1 (2004).

Leonhardt et al., "Micro-Ellipso-Height-Profilometry", Optics Communications, vol. 80, No. 3, 4, pp. 205-209 (Jan. 1, 1991).

Liu et al., "Common path interferometric microellipsometry", SPIE, vol. 2782, pp. 635-645 (1996).

Lyakin et al., "The interferometric system with resolution better than coherence length for determination of geometrical thickness and refractive index of a layer object", Proceedings of the SPIE—The International Society for Optical Engineering SPIE-IN.

Morgan, "Least-Squares estimation in phase-measurement interferometry", Apt. Let., 7(8), pp. 368-370 (1982).

Naqvi, et al., "Linewidth measurement of gratings on photomasks: a simple technique," Appl. Opt., 31(10), 1377-1384 (1992).

Ngoi et al., "Phase-shifting interferometry immune to vibration", Applied Optics, vol. 40, No. 19, pp. 3211-3214 (2001).

Novak et al., "Template-based software for accurate MEMS characterization", Proceedings of SPIE, Fol. 4980, pp. 75-80 (2003).

Onodera et al., "Two-wavelength interferometry that uses a Fourier-transform method", Applied Optics, vol. 37, No. 34, pp. 7988-7994 (Dec. 1, 1998).

Oppenheim et al., "10.3: The time-dependent Fourier Transform", Discrete-Time Signal Processing, 2.sup.nd Edition, pp. 714-722 (Prentice Hall, New Jersey, 1999). cited by other.

Park et al., "Direct quadratic polynomial fitting for fringe peak detection of white light scanning interferograms", Opt. Eng, 39(4), pp. 952-959 (2000).

Pelligrand, S. et al., "Mesures 3D de topographies et de vibrations a l'echelle (sub)micrometrique par microscopie optique interferometrique", Proc. Club CMOI, Methodes et Techniques Optiques pour l'Industrie (2002).

Peng, S.T., et al., "Theory of Periodic Dielect Waveguides," IEEE Trans Microwave Theory and Technique MTT-23(1), 123-133 (1975).

Pfortner et al., "Red-green-blue interferometer for the metrology of discontinuous structures", Applied Optics, vol. 42, No. 4, pp. 667-673 (Feb. 1, 2003).

Pluta, Maksymilian, "Advanced Light Microscopy", vol. 3, (Elsevier, Amsterdam, 1993) pp. 265-271.

Press et al., "Linear Correlation", Numerical Recipes in C, Cambridge University Press, 2.sup.nd Edition, pp. 636-639 (1992).

Raymond, C.J., "Scatterometry for Semiconductor Metrology," in Handbook of silicon semiconductor metrology, A.J. Deibold, Ed. (Marcel Dekker, Inc., New York 2001).

Raymond, et al., "Scatterometry for CD measurements of etched structures," SPIE 2725, 720-728 (1996).

Rosencwaig, Allan et al., "Beam profile reflectometry: A new technique for dielectric film measurements", Applied Physics Letters, vol. 60, No. 11, pp. 1301-1303 (Mar. 16, 1992).

Sandoz et al., "High-resolution profilometry by using phase calculation algorithms for spectroscopic analysis of white-light interferograms", Journal of Modern Optics, vol. 43, No. 4, pp. 701-708 (1996).

Sandoz et al., "Optical implementation of frequency domain analysis for white light interferometry", Proceedings SPIE, vol. 2545, pp. 221-228 (Jun. 1995).

Sandoz et al., "Processing of white light correlograms: simultaneous pahse and envelope measurements by wavelet transformation", SPIE, 3098, pp. 73-82 (1997).

Sandoz, Patrick "Wavelet transform as a processing tool in white-light interferometry", Optics Letters, vol. 22, No. 14, pp. 1065-1067 (Jul. 15, 1997).

Schmit, J. et al., "Extend averaging technique for derivation of error-compensating algorithms in phase-shifting interferometry,"Applied Optics, vol. 34:19, pp. 3610-3619 (Jul. 1, 1995).

Schnell et al., "Dispersive white-light interferometry for absolute distance measurement with dielectric multilayer systems on the target", Optics Letters, vol. 21, No. 7, pp. 528-530 (Apr. 1996).

Schwider et al., "Dispersive interferometric profilometer", Optics Letters, vol. 19, No. 13, pp. 995-997 (Jul. 1994).

See et al., "Scanning optical microellipsometer for pure surface profiling", Applied Optics vol. 35, No. 34, pp. 6663-6668 (Dec. 1, 1996). cited by other.

Shatalin, S. V. et al., "Reflection conoscopy and micro-ellipsometry of isotropic thin film structures", Journal of Microscopy, vol. 179, Part 3, pp. 241-252 (Sep. 1995).

Sheppard et al., "Effect of numerical aperture on interference fringe spacing", Applied Optics, vol. 34, No. 22, pp. 4731-4734 (Aug. 1, 1995).

Totzeck, "Numerical simulation of high-NA quantitative polarization microscopy and corresponding near-fields", Optik, vol. 112, No. 9, pp. 399-406 (2001).

Tripathi et al., "Spectral shaping for non-Gaussian source spectra in optical coherence tomography", Optics Letters, vol. 27, No. 6, pp. 406-408 (2002).

Tzannes et al., Measurement of the modulation transfer function of infrared cameras, Optical Engineering, vol. 34, No. 6, pp. 1808-1817 (Jun. 1995). cited by other.

Willenborg et al, "A novel micro-spot dielectric film thickness measurement system", SPIE, vol. 1594, pp. 322-333 (1991).

Wyant, "Phase shifting interferometry" (1998).

Youngquist, R. C. Carr, S. and Davies, D. E. N., "Optical Coherence-Domain Reflectometry: a New Optical Evaluation Technique", Optical Letters, Mar. 1987, vol. 12, No. 3.

Zhan, Q., et al., "Measurement of surface features beyond the diffraction limit with an imaging ellipsometer," Opt. Lett. 27, 821-823 (2002).

PCT Search Report dated Jun. 10, 2008 by ISA/RO Examiner Lee W. Young.

* cited by examiner

US 7,522,288 B2

COMPENSATION OF SYSTEMATIC EFFECTS IN LOW COHERENCE INTERFEROMETRY

CROSS REFERENCE TO RELATED APPLICATIONS

This application claims benefit of Provisional Patent Application 60/832,452, entitled "COMPENSATION OF SYSTEMATIC EFFECTS IN SCANNING WHITE LIGHT INTERFEROMETRY," filed on Jul. 21, 2006, the entire contents of which are incorporated herein by reference.

TECHNICAL FIELD

This disclosure relates to interferometry, and more particularly to low coherence interferometry.

BACKGROUND

Interferometry (e.g., low coherence interferometry) may be used to determine a spatial property of an object. Typical spatial properties include a surface topography or location of the object with respect to some reference. For objects including a thick film overlying an opaque substrate, the low coherence interferometry data may include two spaced part interference patterns resulting, respectively, from the substrate-film interface and film-air interface. The accuracy of interferometry depends on the quality of the interference signal, which can be degraded by several sources of error, many of these systematic and related to the limitations of the instrument.

SUMMARY

An example of low coherence interferometry is scanning white light interferometry (SWLI), which involves using a light source with a large bandwidth (e.g., about 100 nm or more) compared with other forms of interferometry (e.g., displacement measuring interferometry) which utilize a monochromatic light source. Large bandwidths, however, can degrade the quality of a SWLI signal because of optical aberrations, dispersion and other sources of error, reducing the accuracy of SWLI measurements and/or reducing the number of different objects that can be characterized. For example, when using SWLI to characterize thin films, signal degradation makes it increasingly difficult to extract information about a film from overlapping interference patterns due to the two interfaces of the film.

This disclosure features methods and systems that improve the quality of SWLI signals. Embodiments include methods and systems that improve the quality of SWLI signals by a correction (e.g., a software correction) for system errors, including, in particular, source spectrum distortions and non-linear dispersion in the interferometer. In embodiments, these methods operate on a SWLI signal to produce a corresponding repaired signal in which the effects of system errors are reduced (e.g., eliminated).

In embodiments, in a first step, a system characterization procedure determines the system errors by direct measurement of these errors in the frequency domain after a frequency transform (e.g., a Fourier Transform), in terms of the amplitudes and phases of the transform coefficients. In a second step, SWLI data from a sample to be measured are Fourier transformed into the frequency domain, where the known phase and amplitude system errors are removed by subtraction, division or other data manipulation.

If the data processing proceeds in the frequency domain, the corrected data are transmitted to the next processing stage for determining a characteristic of the object surface. Examples of processing in the frequency domain are discussed in U.S. Publication No. 2004/0189999 A1, entitled "PROFILING COMPLEX SURFACE STRUCTURES USING SCANNING INTERFEROMETRY," by De Groot et al., the entire contents of which is hereby incorporated by reference.

Alternatively to processing in the frequency domain, the data can be transformed back by means of an inverse Fourier Transform to the original signal domain prior to the next processing stage for determining a characteristic of the object surface. Examples of processing in the original signal domain are discussed in U.S. Publication No. 2005/0078318 A1, entitled "METHODS AND SYSTEMS FOR INTERFEROMETRIC ANALYSIS OF SURFACES AND RELATED APPLICATIONS," by De Groot, the entire contents of which is hereby incorporated by reference.

Various aspects of the invention are summarized as follows.

In general, in one aspect, a method is disclosed that includes: (i) acquiring a first data set from a low coherence interference signal using an imaging interferometry system, the low coherence interference signal including information about a measurement object; (ii) using the first data set to generate a second data set, where the second data set is related to the first data set by a frequency transform; and (iii) using the second data set to generate a third data set, where the third data set corresponds to the second data set with reduced contributions due to imperfections in the interferometry system.

Embodiments of the method may include one or more of the following features.

The method may further include determining information about the measurement object from the third data set. For example, determining the information about the measurement object from the third data set may include using the third data set to generate a fourth data set, where the fourth data set is related to the third data set by an inverse frequency transform. For example, the fourth data set may be in the same form as the first data set. Furthermore, the first and fourth data sets may be scanning white light interferometry signal and a repaired scanning white light interferometry signal, respectively.

The information about the measurement object may include information about a surface of the measurement object. For example, the method may further include using the information about the surface to determine a profile of the surface.

The measurement object may include a first portion of a first material and a second portion of a second material and the information about the measurement object may include information about an interface between the first and second portions.

The measurement object may include a film of a material having a thickness of about 10 μm or less (e.g., about 1 μm or less, or even 0.5 μm or less, or even 0.25 μm or less) and the method may further include using the information to determine a profile of the film's thickness.

The imperfections in the interferometry system may include imperfections in an output spectrum of a light source of the interferometry system. For example, the imperfections in the output spectrum may include deviations of the spectrum from a model spectrum. Furthermore, the method may further include determining information about the measurement object from the third data set based on an assumption that the low coherence interference signal was acquired using the model spectrum. The model spectrum may include a single carrier frequency modulated by a Gaussian envelope or a raised cosine.

The frequency transform may be a Fourier transform.

The third data set may be determined using predetermined information acquired using the imaging interferometry system. For example, the predetermined information may be determined from a first artifact data set acquired from a low coherence interference signal from an artifact using the imaging interferometry system. Furthermore, determining the predetermined information may include transforming the artifact data set into a second artifact data set, where the second artifact data set is related to the first artifact data set by a frequency transform.

Determining the third data set may include multiplying each element, $q_\nu$, of the third data set by a corresponding coefficient, $C_\nu^{fix}$, to provide a corresponding element, $q'_\nu$, of the third data set.

In another aspect, a method is disclosed that includes: (i) acquiring a first data set from a low coherence interference signal using an imaging interferometry system, the low coherence interference signal including information about a reference object; (ii) using the first data set to generate a second data set, where the second data set is related to the first data set by a frequency transform; (iii) determining a third data set from the second data set, where the third data set relates the second data set to a model data set, wherein the model data set corresponds to a data set acquired using a model interferometry system having reduced imperfections relative to the interferometry system used to acquire the first data set; and (iv) using the third data set to reduce effects of imperfections in the imaging interferometry system on low coherence interference signals acquired using the imaging interferometer system.

In another aspect, a system is disclosed including: (i) a light source; (ii) an imaging interferometer configured to receive light from the light source, to direct a portion of the light to reflect from a measurement object, to direct another portion o the light to reflect from a reference object, and to combine the light reflected from the measurement and reference objects to produce an output beam; (iii) a detector configured to detect the output beam and to produce an interference signal including information about the measurement object; and (iv) an electronic processor configured to acquire a first data set from the interference signal, to generate a second data set related to the first data set by a frequency transform, and to generate a third data set corresponding to the second data set with reduced contribution due to imperfections in the light source or the interferometer.

Embodiments of the system may include any of the following features.

The electronic processor may be further configured to carry out any of the features corresponding to embodiments of the method described above.

The light source may have an output spectrum having a full width at half maximum (FWHM) of about 50 nm or more, or even 100 nm or more.

The light source may include a light emitting diode, or an arc lamp. For example, the light source may be in the visible portion of the electromagnetic spectrum.

The interferometer may be a Mirau interferometer, or a Linnik interferometer.

The interferometer may have a numerical aperture at the object of about 0.1 or more, or even 0.3 or more.

In general, in another aspect, the invention features a method that includes transforming interferometry data acquired for a test sample using a low coherence imaging interferometry system to a frequency domain and, at a plurality of frequencies in the frequency domain, reducing contributions to the transformed interferometry data due to imperfections in the imaging interferometry system thereby producing compensated interferometry data. The errors are reduced based on variations between interferometry data acquired using the low coherence imaging interferometry system for a calibration sample and model interferometry data corresponding to data acquired for the calibration sample using a model interferometry system.

Implementations of the method can features of other aspects and/or one or more of the following features. For example, the imperfections in the interferometry system can include deviations of an output spectrum of a light source of the interferometry system from a model spectrum of the model interferometry system. The model spectrum can correspond to an analytic function. The analytic function can include a Gaussian function or a raised cosine function.

In some embodiments, the imperfections in the interferometry system include imperfections in optical components in the interferometry system. The imperfections in the optical components can result in non-linear dispersion in the light used by the interferometry system to acquire the interferometry data.

The interferometry data can be transformed to a frequency domain using a Fourier transform. The transformed interferometry data can be characterized by a Fourier coefficient at each of the plurality of frequencies and producing the compensated interferometry data comprises changing the phase of the Fourier coefficient at one or more of the plurality of frequencies. The transformed interferometry data can be characterized by a Fourier coefficient at each of the plurality of frequencies and producing the compensated interferometry data comprises changing the magnitude of the Fourier coefficient at one or more of the plurality of frequencies.

In certain embodiments, the interferometry data can be acquired simultaneously for a plurality of locations of the test sample using a detector array.

The test sample can include a thin film supported by a substrate. The substrate can be a semiconductor substrate.

The calibration sample can be a SiC calibration sample.

In some embodiments, the method includes determining information about the test sample from the compensated interferometry data after reducing the errors. Determining information about the test sample can include transforming the compensated interferometry data into a co-ordinate space domain and analyzing the compensated interferometry data in the co-ordinate space domain. In certain embodiments, determining information about the test sample includes analyzing the compensated interferometry data in the frequency domain. The method can include outputting the information about the test sample. For example, outputting the information can include displaying the information or writing the information to memory. In some embodiments, the information about the test sample includes information about a surface of the test sample. The information about the surface can include a profile of the surface. In certain embodiments, the test sample includes a first portion of a first material and a second portion of a second material and the information about the test sample includes information about an interface between the first and second portions. The test sample can include a film of a material having a thickness of about 10 µm or less (e.g., about 5 µm or less, about 2 µm or less, about 1 µm or less, 0.5 µm or less, 0.25 µm or less) and the information about the test sample comprises a profile of the film's thickness.

In general, in a further aspect, the invention features a method that includes transforming interferometry data acquired for a test sample using a low coherence interferometry system to a frequency domain and, at a plurality of frequencies in the frequency domain, reducing contributions to the transformed interferometry data due to non-linear dispersion in the interferometry system thereby producing compensated interferometry data. The errors are reduced based on variations between interferometry data acquired using the low coherence interferometry system for a calibration sample and model interferometry data corresponding to data acquired for the calibration sample using an interferometry system without the non-linear dispersion. Implementations of the method can include one or more features of other aspects.

In general, in a further aspect, the invention features a system that includes a low coherence light source, an imaging interferometer configured to receive light from the light source, to direct a portion of the light to reflect from a test sample, to direct another portion of the light to reflect from a reference object, and to combine the light reflected from the measurement and reference objects to produce an output beam, a detector configured to detect the output beam and to produce an interference signal comprising information about the test sample, and an electronic processor in communication with the detector, the electronic processor being configured to transform interferometry data derived from the interference signal to a frequency domain and, at a plurality of frequencies in the frequency domain, reduce contributions to the transformed interferometry data due to imperfections in the imaging interferometer or the light source thereby producing compensated interferometry data. The errors are reduced based on variations between interferometry data acquired using the imaging interferometer for a calibration sample and model interferometry data corresponding to data acquired for the calibration sample using a model interferometry system.

Embodiments of the system can include one or more of the following features and/or features of other aspects. For example, the model interferometry system can have reduced imperfections in the imaging interferometer or the light source. The model interferometry system can have reduced imperfections in both the imaging interferometer and the light source. The imperfections in the light source can include deviations of the source spectrum from a model spectrum. The model spectrum can correspond to an analytic function. The analytic function can include a Gaussian function or a raised cosine function.

The imperfections in the imaging interferometer can include nonlinear dispersion in the interferometer.

The light source can have an output spectrum having a full width at half maximum (FWHM) of about 50 nm or more (e.g., about 100 nm or more, about 200 nm or more).

The light source can include a light emitting diode or an arc lamp. Light from the light source can be in the visible portion of the electromagnetic spectrum (e.g., in a range from about 400 nm to about 700 nm).

The interferometer can be a Mirau interferometer, a Linnik interferometer, or a Michelson interferometer.

The interferometer can have a numerical aperture at the object of about 0.1 or more (e.g., about 0.2 or more, about 0.3 or more, about 0.4 or more, about 0.5 or more).

Among other advantages, embodiments can extend the useable bandwidth of a light source in an interferometry system with little or no modification to the interferometry system hardware. For examples, usable spectral bandwidth of a light sauce may be extended (e.g., by up to 100% or more) without any substantial loss in the signal to noise ratio of the SWLI signal.

Broad spectral bandwidth light sources can improve resolution of interferometry measurements. Relative to comparable sources with narrower bandwidths, broad bandwidth sources improve resolution because they provide narrower SWLI signal modulation envelopes and increased ranges of constituent frequencies for frequency analysis. Accordingly, the resolution of surface profile measurements can be improved and signals from different interfaces can be more easily separated when measuring thin films.

We note that while SWLI is an acronym for scanning white light interferometry, as used in the present application, SWLI is meant to include broadband radiation that is in any of the ultraviolet, visible, near-infrared, or infrared regions of the electromagnetic spectrum. Further, the basics of SWLI signal processing extend, despite the nomenclature, to any interferometer in which coherence plays a role in the measurement; for example, a narrow-bandwidth interferometer having a high NA (numerical aperture) objective that has localized interference fringes by virtue of limited spatial coherence.

Implementations can be readily implemented with existing SWLI signal analysis algorithms. For example, algorithms can be implemented to correct the signal for hardware defects (e.g., source defects and/or dispersion) without performing other operations that change the form of the signal data. Accordingly, the algorithm output can be in the same form as the original SWLI signal data, allowing further signal processing of the output using algorithms designed to analyze the original SWLI signal data.

The interferometry systems that use the algorithms discussed herein can be used to characterize thin films, such as dielectric thin films that have a thickness of about 1 μm or less.

The details of one or more embodiments of the invention are set forth in the accompanying drawings and the description below. Other features and advantages of the invention will be apparent from the description, the drawings, and the claims.

DESCRIPTION OF DRAWINGS

FIGS. 15A and 15B show the structure before and after planarization, respectively.

FIG. 16A shows the structure before addition of the solder. FIG. 16B shows the structure after the addition of the solder but prior to flowing the solder.

Like reference symbols in the various drawings indicate like elements.

DETAILED DESCRIPTION

Figure 1:
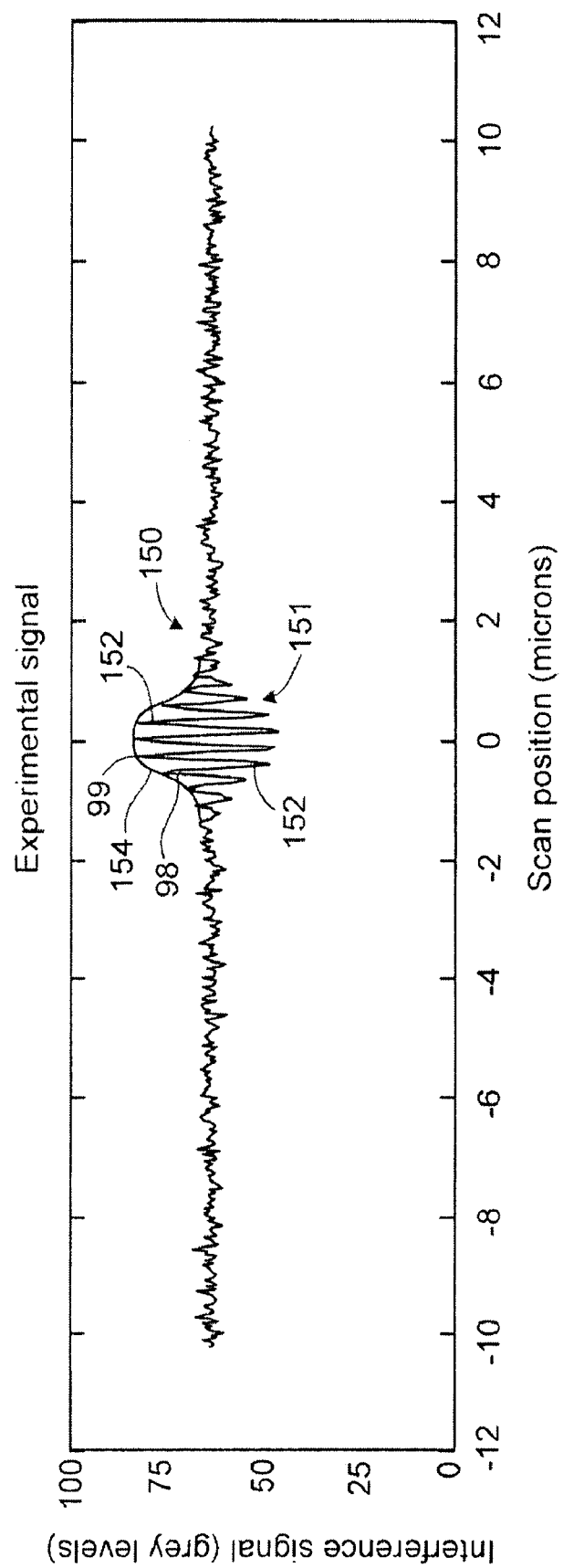
FIG. 1 is an example of a scanning white light interferometry (SWLI) signal.

Referring to FIG. 1, a simulated low coherence interference signal 150 includes a plurality of detector intensity values obtained from a single point of an object, e.g., a point of a silicon wafer having a single reflective interface. The intensity values are plotted as a function of an optical path length difference (OPD) between light reflected from the object point and light reflected from a reference object in the interferometer. Interference signal 150 is a low coherence scanning white light interferometry (SWLI) signal obtained by scanning the OPD, e.g., by moving an optic and/or the object to vary the optical path traveled by the light reflecting from the object or the reference light.

In FIG. 1, the intensity values are plotted as a function of OPD (here scan position) and map out an interference pattern 151 having a plurality of fringes 152, which decay on either side of a maximum according to a low coherence envelope 154. In the absence of a low coherence envelope, the fringes of an interference pattern typically have similar amplitudes over a wide range of optical path differences. The envelope 154 itself does not expressly appear in such interference signals but is shown for discussion. The location of the interference pattern along the OPD axis is generally related to a position of zero OPD, e.g., a scan position or spatial position corresponding to zero OPD between light reflected from the object point and from a reference object. The zero OPD scan position is a function of the object topography, which describes the relative height of each object point, and the orientation and position of the object itself, which influences the position of each object point with respect to the interferometer. The interference signal also includes instrumental contributions related to, e.g., the interferometer optics, e.g., the numerical aperture (NA) of the optics, the data acquisition rate, the scan speed, the wavelengths of light used to acquire the interference signal, the detector sensitivity as a function of wavelength, and other instrumental properties.

The width of the coherence envelope 154 that modulates the amplitudes of fringes 152 corresponds generally to the coherence length of the detected light. Among the factors that determine the coherence length are temporal coherence phenomena related to, e.g., the spectral bandwidth of the source, and spatial coherence phenomena related to, e.g., the range of angles of incidence of light illuminating the object. Typically, the coherence length decreases as: (a) the spectral bandwidth of the source increases and/or (b) the range of angles of incidence increases. Depending upon the configuration of an interferometer used to acquire the data, one or the other of these coherence phenomena may dominate or they may both contribute substantially to the overall coherence length. The coherence length of an interferometer can be determined by obtaining an interference signal from an object having a single reflecting surface, e.g., not a thin film structure. The coherence length corresponds to the full width half maximum of the envelope modulating the observed interference pattern.

As can be seen from FIG. 1, interference signal 150 results from detecting light having a range of optical path differences that varies by more than the width of the coherence envelope and, therefore, by more than the coherence length of the detected light. In general, a low coherence interference signal can result from obtaining interference fringes that are amplitude modulated by the coherence envelope of the detected light. For example, the interference pattern may be obtained over an OPD for which the amplitude of the observed interference fringes differs by at least 20%, at least 30% or at least 50% relative to one another. For example, fringe 98 has a peak amplitude that is about 50% less than a peak amplitude of a fringe 99.

A low coherence interferometer can be configured to detect an interference signal is detected over a range of OPD's that is comparable to or greater than the coherence length of the interferometer. For example, the range of detected OPD's may be at least 2 times greater or (e.g., about 3 times or more, about 5 times or more, about 10 times or more greater than the coherence length). In some embodiments, the coherence length of the detected light is on the order of the height variations of features of the object, e.g., on the order of a couple of microns or less but more than a nominal wavelength of the detected light.

In general, instrument related contributions to the interference signal, e.g., to the shape and/or phase of the interference patterns, tend to vary slowly with the topography and position of the object. On the other hand, interference patterns shift along the scan position axis for interference signals obtained from object points having different spatial properties, e.g., different relative heights or different relative positions with respect to the interferometer. Accordingly, interference patterns obtained from different object points may have similar shapes but are shifted along the scan position axis by an amount related to the spatial properties of each point.

Figure 2:
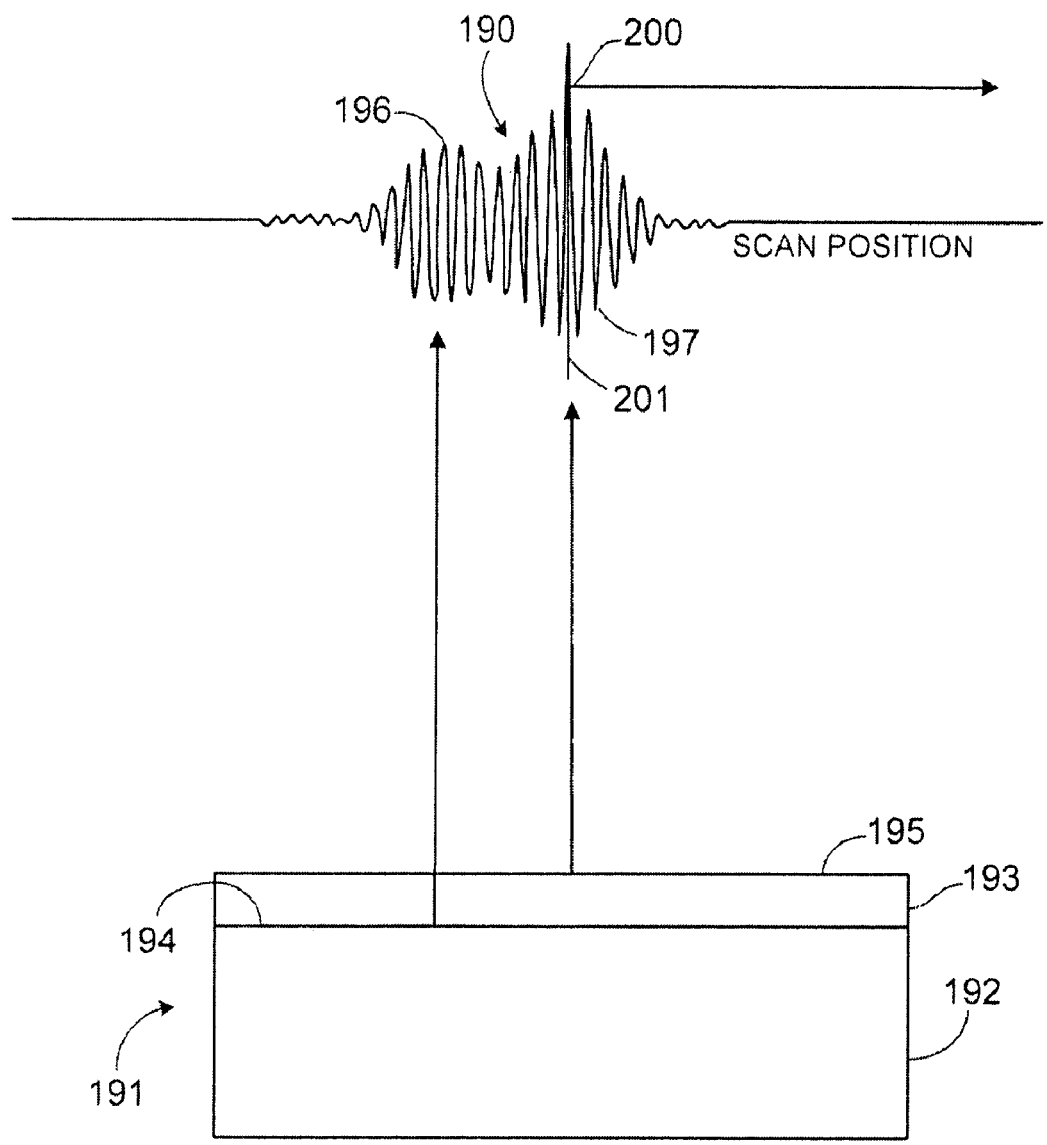
FIG. 2 is an example of a SWLI signal and corresponding test sample including a thin film.

Referring to FIG. 2, an interference signal 190 is acquired from an object 191, which includes a substrate 192 and an overlying layer, e.g., a thin film 193. The substrate and film define an interface 194 therebetween. An outer surface of the film 195 defines an interface between the object and its surroundings, e.g., the air, other gas, or vacuum. Interfaces are generally defined by a change in refractive index between portions of an object.

Interference signal 190 includes a first interference pattern 196 resulting from interface 194 and a second interference pattern 197 resulting from interface 195. First and second interference patterns 196, 197 are overlapping. For example, maxima of the interference patterns 196, 197 are separated by an OPD less than the coherence length of the interferometer and patterns 196, 197 are not separated by a region of zero intensity. Existing methods for determining spatial properties of an object with interfaces that produce overlapping interference patterns can yield erroneous results because the overlapping interference patterns distort one another. Applicants Spatial properties of an object with such interfaces can be determined based upon a portion over the overlapping interference patterns. For example, a spatial property of interface 195, e.g., a topography of the outer surface of object 191, can be determined based upon a subset 200 of interference signal 190. Subset 200 is dominated by contributions from interference pattern 197 (from interface 195) as opposed to contributions from interference pattern 196 (from interface 194). A spatial property of interface 194 can be determined based upon a subset similar to subset 200 but located toward the left of the overlapping patterns.

Figure 3:
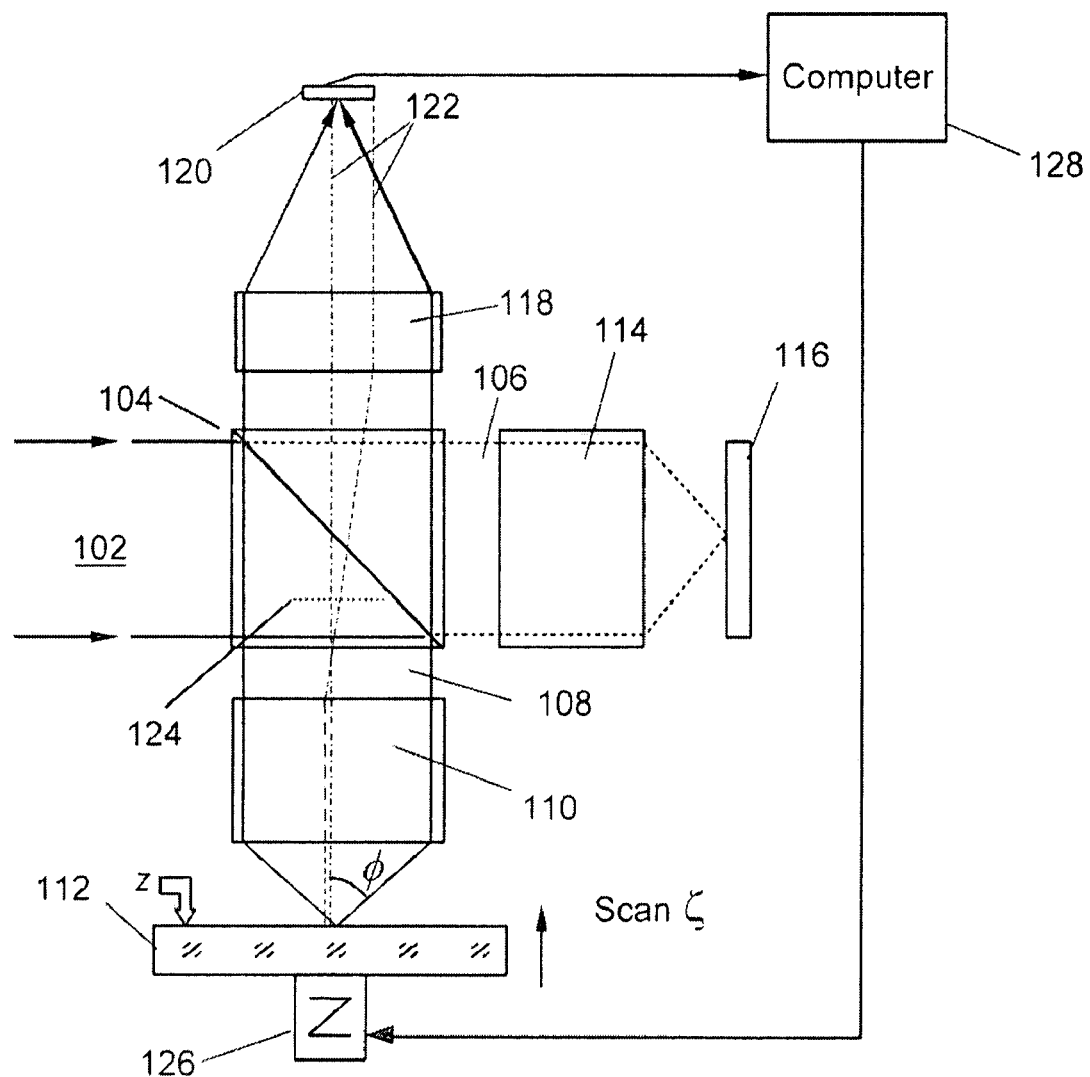
FIG. 3 is a schematic drawing of a Linnik-type scanning interferometer.

Examples of interferometers than can be configured as low coherence scanning interferometers include Michelson, Linnik and Mirau interferometers. FIG. 3 shows a scanning interferometer of the Linnik type. Illumination light 102 from a source (not shown) is partially transmitted by a beam splitter 104 to define reference light 106 and partially reflected by beam splitter 104 to define measurement light 108. The measurement light is focused by a test objective 110 onto a test sample 112 (e.g., a sample comprising a thin single- or multilayer film of one or more dissimilar materials). Similarly, the reference light is focused by a reference objective 114 onto a reference mirror 116. Preferably, the measurement and reference objectives have common optical properties (e.g., matched numerical apertures). Measurement light reflected (or scattered or diffracted) from the test sample 112 propagates back through test objective 110, is transmitted by beam splitter 104, and imaged by imaging lens 118 onto a detector 120. Similarly, reference light reflected from reference mirror 116 propagates back through reference objective 114, is reflected by beam splitter 104, and imaged by imaging lens 118 onto a detector 120, where it interferes with the measurement light.

For simplicity, FIG. 3 shows the measurement and reference light focusing onto particular points on the test sample and reference mirror, respectively, and subsequently interfering on a corresponding point on the detector. Such light corresponds to those portions of the illumination light that propagate perpendicular to the pupil planes for the measurement and reference legs of the interferometer. Other portions of the illumination light ultimately illuminate other points on the test sample and reference mirror, which are then imaged onto corresponding points on the detector. In FIG. 3, this is illustrated by the dashed lines 122, which correspond to the chief rays emerging from different points on the test sample that are imaged to corresponding points on the detector. The chief rays intersect in the center of the pupil plane 124 of the measurement leg, which is the back focal plane of test objective 110. Light emerging from the test sample at an angle different from that of the chief rays intersect at a different location of pupil plane 124.

In some embodiments, detector 120 is a multiple element (i.e., multi-pixel) camera to independently measure the interference between the measurement and reference light corresponding to different points on the test sample and reference mirror (i.e., to provide spatial resolution for the interference pattern).

A scanning stage 126 coupled to test sample 112 scans the position of the test sample relative to test objective 110, as denoted by the scan coordinate $\zeta$ in FIG. 3. For example, the scanning stage can be based on a piezoelectric transducer (PZT). Detector 120 measures the intensity of the optical interference at one or more pixels of the detector as the relative position of the test sample is being scanned and sends that information to a computer 128 for analysis.

Because the scanning occurs in a region where the measurement light is being focused onto the test sample, the scan varies the optical path length of the measurement light from the source to the detector differently depending on the angle of the measurement light incident on, and emerging from, the test sample. As a result, the optical path difference (OPD) from the source to the detector between interfering portions of the measurement and reference light scale differently with the scan coordinate $\zeta$ depending on the angle of the measurement light incident on, and emerging from, the test sample. In other embodiments of the invention, the same result can be achieved by scanning the position of reference mirror 116 relative to reference objective 114 (instead of scanning test sample 112 relative to test objective 110).

This difference in how OPD varies with the scan coordinate $\zeta$ introduces a limited coherence length in the interference signal measured at each pixel of the detector. For example, the interference signal (as a function of scan coordinate) is typically modulated by an envelope having a spatial coherence length on the order of $\lambda/2(NA)^2$, where $\lambda$ is the nominal wavelength of the illumination light and NA is the numerical aperture of the measurement and reference objectives. The modulation of the interference signal provides angle-dependent information about the reflectivity of the test sample. To increase the limited spatial coherence, the objectives in the scanning interferometer can define a large numerical aperture. For example, the objectives can define a numerical aperture of about 0.5 or more (e.g., about 0.7 or more, about 0.8 or more, about 0.9 or more). The interference signal can also be modulated by a limited temporal coherence length associated with the spectral bandwidth of the illumination source. Depending on the configuration of the interferometer, one or the other of these limited coherence length effects may dominate, or they may both contribute substantially to the overall coherence length.

Figure 4:
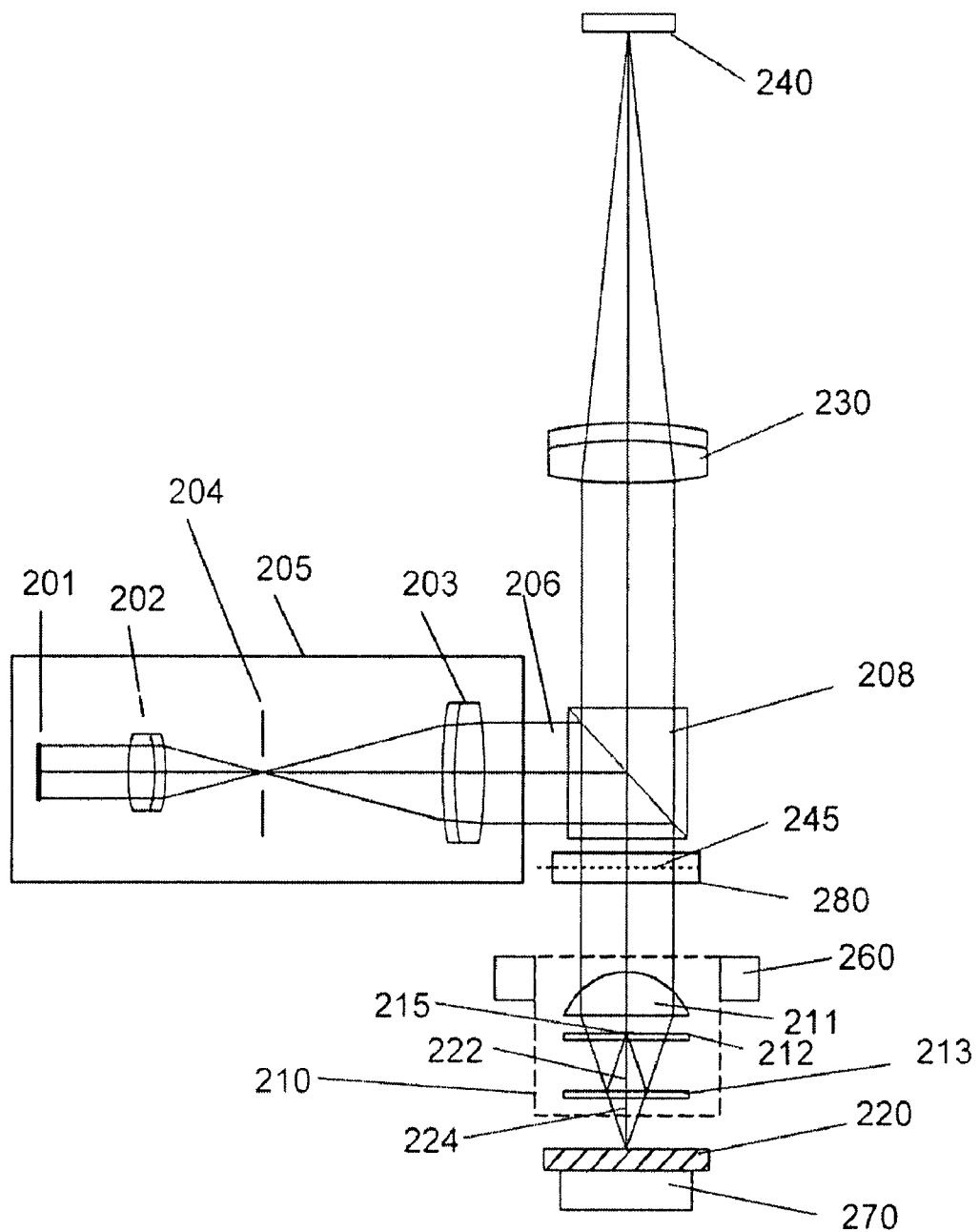
FIG. 4 is a schematic drawing of a Mirau-type scanning interferometer.

Another example of a scanning interferometer is a Mirau interferometer shown in FIG. 4. Here, a source module 205 provides illumination light 206 to a beam splitter 208, which directs it to a Mirau interferometric objective assembly 210. Assembly 210 includes an objective lens 211, a reference flat 212 having a reflective coating on a small central portion thereof defining a reference mirror 215, and a beam splitter 213. During operation, objective lens 211 focuses the illumination light towards a test sample 220 through reference flat 212. Beam splitter 213 reflects a first portion of the focusing light to reference mirror 215 to define reference light 222 and transmits a second portion of the focusing light to test sample 220 to define measurement light 224. Then, beam splitter 213 recombines the measurement light reflected (or scattered) from test sample 220 with reference light reflected from reference mirror 215, and objective 211 and imaging lens 230 image the combined light to interfere on detector (e.g., a multi-pixel camera) 240. As in the system of FIG. 3, the measurement signal(s) from the detector is sent to a computer (not shown).

The scanning in the embodiment of FIG. 4 involves a piezoelectric transducer (PZT) 260 coupled to Mirau interferometric objective assembly 210, which is configured to scan assembly 210 as a whole relative to test sample 220 along the optical axis of objective 211 to provide the scanning interferometry data I($\zeta$,h) at each pixel of the camera. Alternatively, the PZT may be coupled to the test sample rather than assembly 210 to provide the relative motion there between, as indicated by PZT actuator 270. In certain embodiments, the scanning may be provided by moving one or both of reference mirror 215 and beam splitter 213 relative to objective 211 along the optical axis of objective 211.

Source module 205 includes a spatially extended source 201, a telescope formed by lenses 202 and 203, and a stop 204 positioned in the front focal plane of lens 202 (which coincides with the back focal plane of lens 203). This arrangement images the spatially extended source onto a pupil plane 245 of Mirau interferometric objective assembly 210, which is an example of Koehler imaging. The size of stop 204 controls the size of the illumination field on test sample 220. In some embodiments, the source module may include an arrangement in which a spatially extended source is imaged directly onto the test sample, which is known as critical imaging. Either type of source module may be used with other types of interferometer, such as the Linnik-type scanning interferometry system of FIG. 3.

Figure 5A:
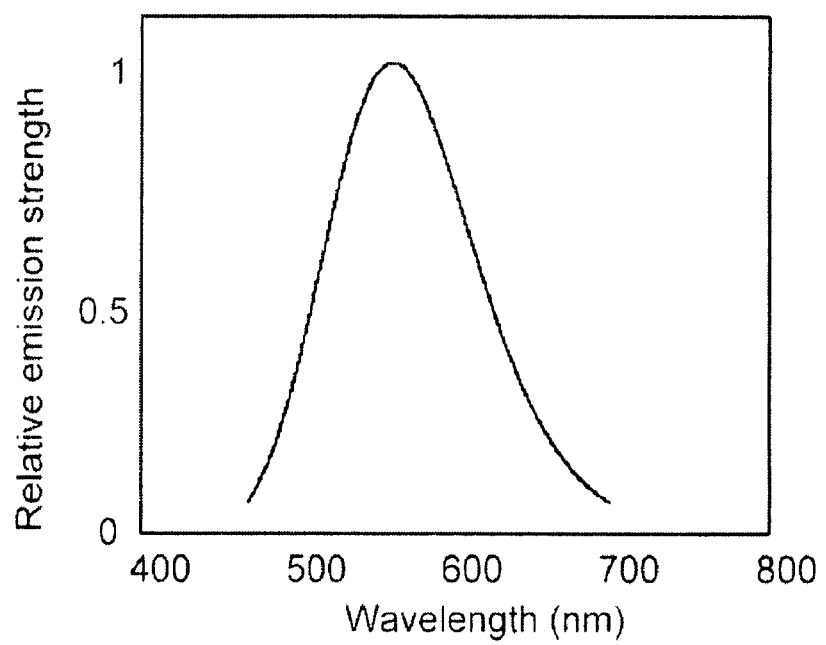
FIGS. 5A and 5B are a simulated example of a broadband spectrum and corresponding SWLI signal, respectively.
Figure 5B:
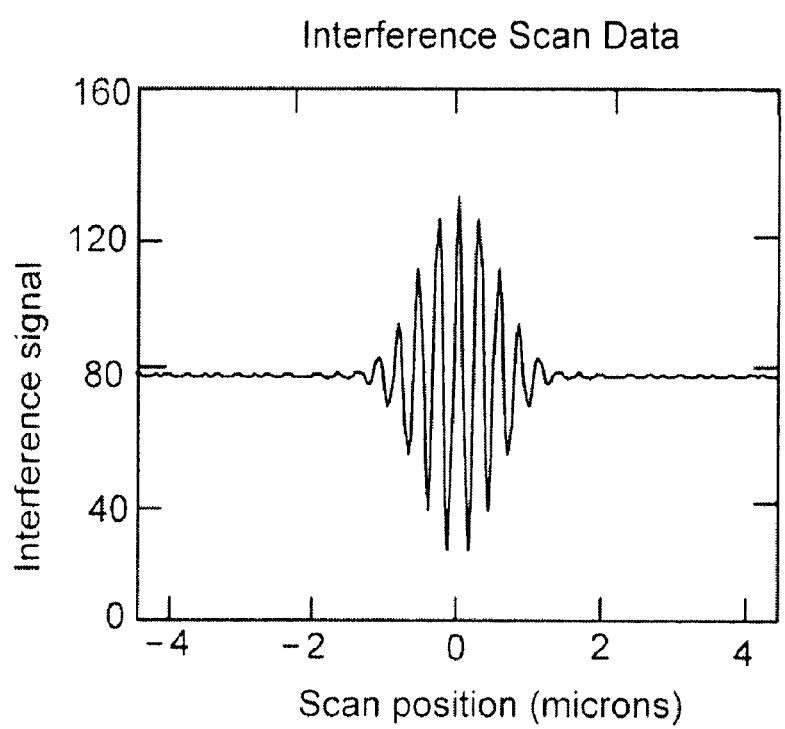

In certain embodiments, analysis of low coherence signals to determine information about a test sample involves comparing a measured interferometry signal (or information obtained from the measured interferometry signal) to a modeled signal (or information related to a signal obtained using a model). Many models assume that the spectrum of the interferometry system light source has a distribution corresponding to an analytic function, such as a single-frequency carrier modulated by a Gaussian envelope, for example. An example of a simulated Gaussian-modulated carrier is shown in FIG. 5A. This example is for a 560 nm center wavelength, with 110-nm FWHM spectrum. The spectrum is Gaussian in the frequency domain, hence slightly lopsided to the left in the wavelength domain. FIG. 5B shows a simulated SWLI signal for the source spectrum shown in FIG. 5A.

Figure 6A:
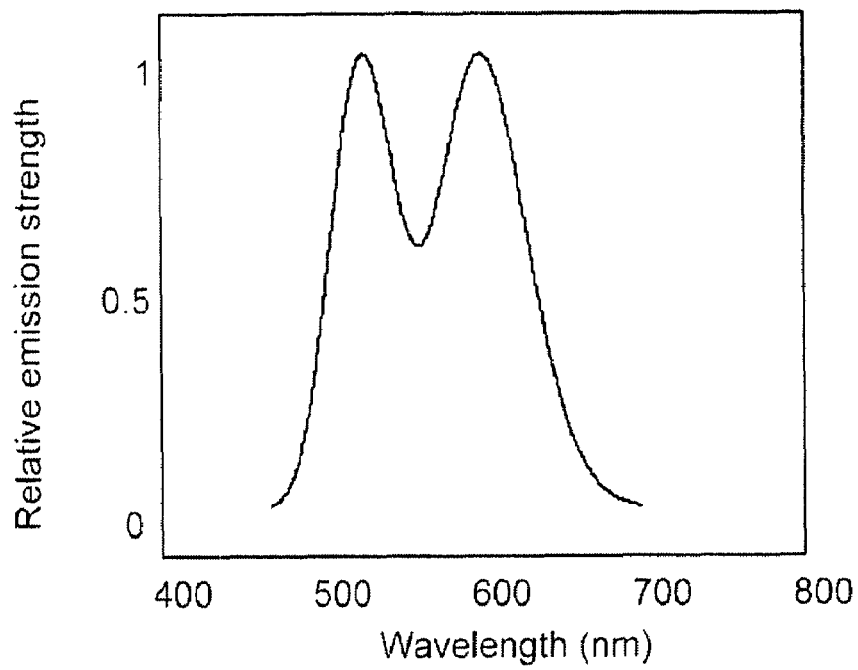
FIGS. 6A and 6B are a simulated example of a broadband spectrum and corresponding SWLI signal, respectively.
Figure 6B:
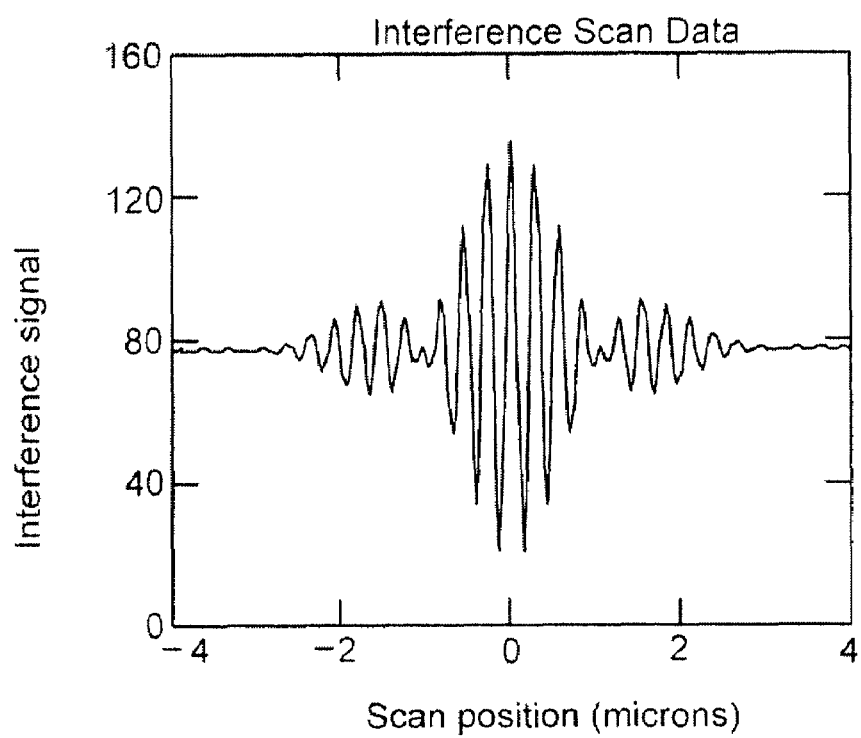

In general, light source spectra are more complex than the Gaussian-modulated carrier shown above. For example, in some embodiments, a light source spectra can include two or more peaks. Referring to FIG. 6A, an example of a more complicated spectrum is one includes two peaks. Such a spectrum can be provided, for example, from a light source that includes two light emitting diodes where each diode has a different peak wavelength. FIG. 6B shows a simulated SWLI signal for the source spectrum shown in FIG. 6A. Compared to the signal shown in FIG. 5B, this signal includes additional sidelobes, which can a thin film analysis of the signal.

Furthermore, analysis of low coherence signals often does not fully account for optical imperfections in the interferometer. For example, interferometers generally introduce a phase delay for a given surface height value of a test sample surface as a function of wavelength and of the incident angle in the test sample illumination. This phase delay is referred to as dispersion. Dispersion can result in part from an imbalance in the amount of glass in the measurement and reference legs, a common difficulty with, e.g., Linnik interferometers. If dispersion is nonlinear, the net effect can be a loss of fringe contrast and a broadening of the coherence envelope in the low coherence signal.

Figure 7A:
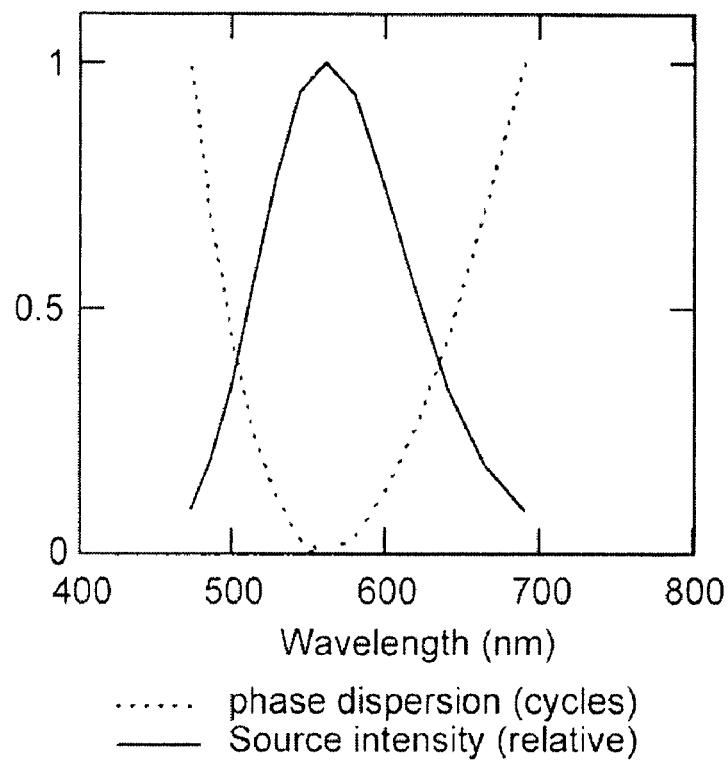
FIG. 7A is a simulated example of a broadband spectrum and a corresponding dispersion spectrum.
Figure 7B:
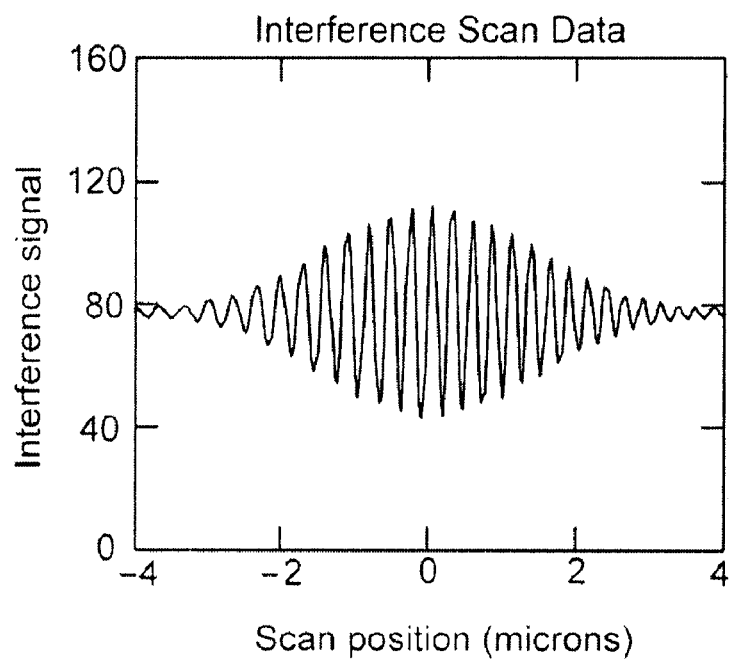
FIG. 7B is a simulated SWLI signal corresponding to the broadband spectrum and dispersion spectrum shown in FIG. 7A.

As an example of the effect of nonlinear dispersion on an interference signal, consider the effect of dispersion on a simulated signal using the same light source spectrum shown in FIG. 5A. FIG. 7A shows a simulated phase delay spectrum in addition to the light source spectrum shown in FIG. 5A. The phase delay due to dispersion is shown relative to the phase at the peak frequency of the light source. FIG. 7B shows that this effect can dominate coherence width and nullify the benefits of a broad bandwidth light source.

The effects of imperfections (e.g., the source distortions and nonlinear dispersion discussed above) in interferometry data can be reduced as outlined below. Without wishing to be bound by theory, a discretely-sampled low coherence interferometry signal, I, can be expressed as an incoherent sum of interference patterns over a range of frequencies K:

$$I_j = \sum_{z=0}^{N-1} q_{j,v} \exp(i\zeta_z K_v). \quad (1)$$

The range of frequencies is a consequence of both the spectral bandwidth of the interferometry system source and geometric effects of incoherent illumination at nonzero NA. In Eq. (1), $\zeta$ is the interferometer scan coordinate orthogonal to the object surface, N is the number of samples taken during the scan, q is a Fourier coefficient, j is the index of the element of the detector array, and z, v are the indices for the scan position $\zeta 0$ and frequency K, respectively. Assuming uniform sampling over a scan range that encompasses the entire envelope of the interference signal I, the inverse relationship $$q_{j,v} = \frac{1}{N} \sum_{z=0}^{N-1} I_j \exp(i\zeta_z K_v) \quad (2)$$

that takes one from the from the original intensity data, $I_j$, to the corresponding Fourier coefficients.

Modeling predicts the Fourier coefficients by incoherent sums of constituent interference patters over all wavelengths $\lambda$, all incident angles $\Psi$ and for both polarizations combined (see, e.g., P. de Groot, X. Colonna de Lega "Signal modeling for low coherence height-scanning interference microscopy," Appl. Opt., 43(25), 4821 (2004)). For positive nonzero frequencies K>0, the Fourier coefficients can be expressed as $$q_v = \exp(iK_v h) \quad (3)$$
$$\sum_u \sqrt{R(\beta, k_u) Z(\beta, k_u)} \exp\{i[\upsilon(\beta, k_u) - \omega(\beta, k_u)]\} \Gamma(\beta, k_u)$$

Where h is the location of the test sample surface along the z-axis and the values of the directional cosine $\beta = \cos(\Psi)$ for each angular wavenumber $k = 2\pi/\lambda$ in Eq. (3) satisfy $$\beta = K/2k_u. \quad (4)$$

The discrete sum in Eq. (3) is over an equally-spaced grid of k>K/2 values indexed by u. Z is the effective object intensity reflectivity, including, e.g., the effects of the beamsplitter, and R is the effective reference reflectivity, including both the beamsplitter and the reference mirror. The phase terms each have a contribution $\omega$ for the object path in the interferometer, including thin film effects and such from the object surface, and a contribution $\upsilon$ for the reference path, including the reference mirror and objective optics. For convenience and without loss of generality, we can define $\upsilon$ as the system error and $\omega$ as the test sample phase change on reflection (PCOR). The weighting factor $\Gamma$ accounts for the spectral and pupil plane distributions in the instrument.

The Fourier coefficients may be expressed by their magnitudes and phases:

$$q_{j,v} = P_{j,v} \exp(i\phi_v). \tag{5}$$

As is noted above in Eq. (3), the phase values $\phi$ are the net result of integral summations of complex exponentials over all wavelengths $\lambda$ and over all incident angles $\Psi$ that when combined have the same frequency K. Since the resultant phase $\phi$ is the argument of this sum of complex numbers, we cannot readily and generally separate the contributions for the system error $\upsilon$ from the part PCOR $\omega$. The same caution applies to the magnitude P.

By making certain approximations, it is possible to separate system errors (for example, imperfections in the spectral distribution and a dispersion characteristics of the system) from characteristics of the test sample. Consider, for example, the limit cases to reduce the sum in Eq. (3) to a product of two complex numbers, $\rho^{sys}\rho^{part}$, one representing the system and the other the part characteristics, respectively:

$$q_v = \exp(iK_v h)\rho_v^{sys}\rho_v^{part} \tag{6}$$

This, in principle, makes the phase contributions additive and therefore separable.

One approximation that can allow the system and part errors to be separated is where the interferometry system uses monochromatic illumination in conjunction with an interferometer having a relatively high NA (e.g., about 0.5 or more). Here, the range of k values centered about a nominal $k^0$ is assumed small enough that the terms of the sum may be considered constant for a given K, and therefore can be brought out in front of the sum. Thus, one can then write $$\rho_v^{sys} = \sqrt{R\left(\beta = \frac{K_v}{2k^0}, k^0\right)} \exp\left[i\upsilon\left(\beta = \frac{K_v}{2k^0}, k^0\right)\right] \sum_u \Gamma\left(\beta = \frac{K_v}{2k_u}, k_u\right) \tag{7}$$

$$\rho_v^{part} = \sqrt{Z\left(\beta = \frac{K_v}{2k^0}, k^0\right)} \exp\left[i\omega\left(\beta = \frac{K_v}{2k^0}, k^0\right)\right] \tag{8}$$

Note that in this case, there is a direct correspondence between the Fourier frequencies K and the directional cosine $\beta = K/2k^0$. Thus the Fourier coefficient magnitudes follow closely the optical spectrum, as shown by P. de Groot and X. Colonna de Lega in "Signal modeling for low coherence height-scanning interference microscopy," Appl. Opt., 43(25), 4821 (2004).

Another possible approximation that can allow the system and part errors to be separated is where broadband illumination is used in conjunction with a relatively low NA interferometer. Here, there is a limited range of incident angles $\Psi$ such that once again the terms in Eq. (3) are essentially constant over the limited range of k values consistent with the constraint of Eq. (4). Then $$\rho_v^{sys} = \sqrt{R\left(\beta^0, k = \frac{K_v}{2\beta^0}\right)} \exp\left[i\upsilon\left(\beta^0, k = \frac{K_v}{2\beta^0}\right)\right] \sum_u \Gamma\left(\beta = \frac{K_v}{2k_u}, k_u\right) \tag{9}$$

$$\rho_v^{part} = \sqrt{Z\left(\beta^0, k = \frac{K_v}{2\beta^0}\right)} \exp\left[i\omega\left(\beta^0, k = \frac{K_v}{2\beta^0}\right)\right] \tag{10}$$

where $\beta^0$ is the nominal directional cosine. Examples include low NA (e.g., $\beta \approx 1$) and ring sources, corresponding, e.g., to a restricted pupil encompassing the central obscuration of a high-NA Mirau. In this case, there is a direct correspondence between the Fourier frequencies K and the wavenumbers $k = K/2\beta^0$. Thus the Fourier coefficient magnitudes follow closely the optical spectrum.

These two limit cases establish that it is feasible to some degree of approximation to separate the system and part characteristics as in Eq. (6).

Figure 8:
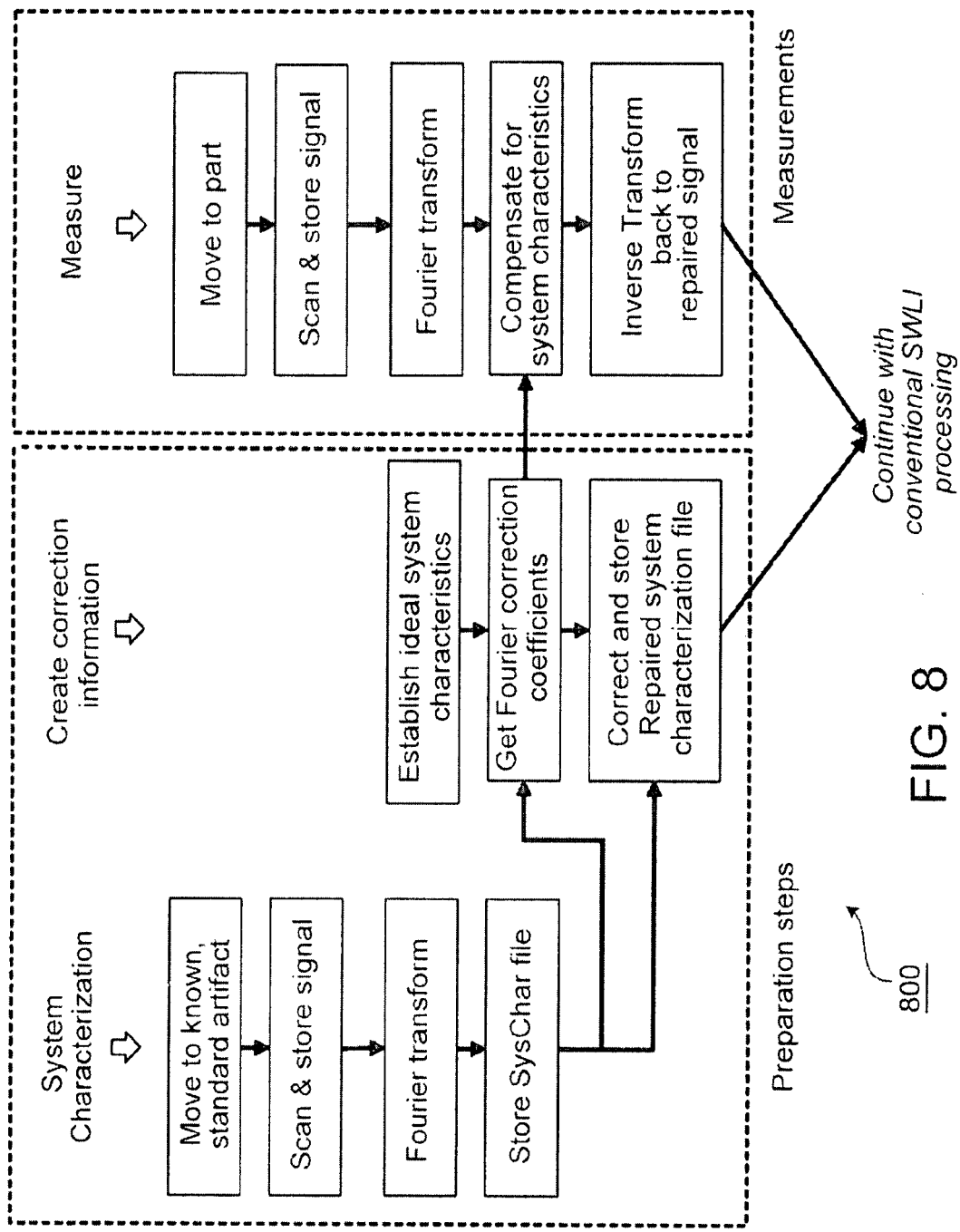
FIG. 8 is a flowchart showing steps for improving the accuracy of a SWLI measurement.

Referring now to FIG. 8, flow chart 800 summarizes a signal repair procedure. The user decides in a setup sequence what ideal system behavior would be. For example, a model illumination spectrum can have a symmetric, smoothly apodized form such as a Gaussian. Nonlinear dispersion is generally undesirable, so a model system should generally be free of nonlinear dispersion as well.

The next step is to measure a low coherence interference signal for a calibration sample using the interferometry system. In some embodiments, the calibration sample is a dielectric that introduces little distortion to the optical spectrum and exhibits low nonlinear angle and wavelength-dependent PCOR. Examples of calibration samples include flat samples of SiC. This step, referred to as system characterization, is discussed in more detail below.

Comparing the ideal with the actual system characteristics provides a list of correction coefficients for the Fourier components. Assuming that the system configuration reasonably approximates a situation that meets the separability requirements for the $\rho^{sys}$ and $\rho^{part}$ described above, these coefficients are the same regardless of part type in subsequent measurements, including test sample including thin film structures, so that the algorithm can compensate for the system characteristics as shown in FIG. 8.

Once the signal has been repaired, analysis can be continued in the frequency domain (FDA) (such as described in U.S. Publication No. 2004/0189999 A1, entitled "PROFILING COMPLEX SURFACE STRUCTURES USING SCANNING INTERFEROMETRY," by De Groot et al., for example) or can be continued by inverse transforming back to the original signal or scan domain (such as described in U.S. Publication No. 2005/0078318 A1, entitled "METHODS AND SYSTEMS FOR INTERFEROMETRIC ANALYSIS OF SURFACES AND RELATED APPLICATIONS," by De Groot, for example). In either case, the subsequent analysis proceeds as it would have without the signal repair step. Another analytical technique that may be used is disclosed in U.S. patent application Ser. No. 11/437,002 by Peter de Groot entitled "METHOD AND SYSTEM FOR ANALYZING LOW-COHERENCE INTERFEROMETRY SIGNALS FOR INFORMATION ABOUT THIN FILM STRUCTURES," filed May 18, 2006, the contents of which are incorporated herein by reference. In this sense, the signal repair is a black box preprocessor that simply improves signal quality prior to the usual low coherence interferometry analysis.

Turning to the details of system characterization, this procedure involves a measurement of a known sample, usually a clean flat sample of a near dielectric material such as SiC. A convenient simplifying assumption is that the part itself contributes negligibly to the results of the system characterization analysis, so that system errors are measured directly. Expressed another way, $$\rho^{part} \approx 1 \text{ (during system characterization).} \tag{11}$$

Alternatively, the calculation can account more accurately for the reflectivity of the part, which can be calculated using the Fresnel formulae. For example, in some embodiments, the measured Fourier coefficients can be divided by theoretically known part characteristics.

Assuming that the scan domain signal $I^{sys}$ acquired during system characterization has uniform sampling, a forward Fourier Transform (FT) provides frequency-domain values $q^{sys}$ for each pixel:

$$q_{j,v}^{sys} = \sum_{z=0}^{N^{sys}-1} I_j^{sys} \exp(i \zeta_z^{sys} K_v). \tag{12}$$

The next step is to extract and average the magnitudes and phases within the region of interest defined by the frequency indices (or bins) vmin<v<vmax:

$$\overline{P_v^{sys}} = \frac{1}{Y} \sum_{j=0}^{Y-1} P_{j,v}^{sys} \tag{13}$$

$$\overline{\phi_v'^{sys}} = \frac{1}{Y} \sum_{j=0}^{Y-1} \phi_{j,v}''^{sys} \tag{14}$$

where Y is the total number of pixels and $$P_{j,v}^{sys} = |q_{j,v}^{sys}| \tag{15}$$

and the measured phase as a function of angular frequency is $$\phi_{j,v}''^{sys} = \text{connect}(\phi_{j,v}'''^{sys}) \tag{16}$$

for $$\phi_{j,v}'''^{sys} = \arg(q_{j,v}^{sys}). \tag{17}$$

Here, the function connect connects across angular frequencies for each pixel. Where one is interested only in the nonlinear portion of $\overline{\phi_v'^{sys}}$ independent of height and offset, the linear part of $\overline{\phi_v'^{sys}}$ is removed, leaving the nonlinear portion of $\overline{\phi_v'^{sys}}$ The nonlinear portion of $\overline{\phi_v'^{sys}}$ is defined as $$\phi_v^{sys} = \text{nonlin}(\overline{\phi_v'^{sys}}) \tag{18}$$

The spectral contributions outside the region of interest are set to zero. Usually it is sufficient to operate only on positive nonzero frequencies as the negative frequency values for q will all be complex conjugates of the positive ones.

The three primes for the phase data $\phi'''^{sys}$ in the frequency domain indicate that there are multiple $2\pi$ uncertainties in the phase information: from angular frequency 0 to angular frequency K, from pixel to pixel, and overall with respect to an absolute reference. As mentioned previously, the connect function in Eq. (16) removes one of these primes by connecting across angular frequencies for each pixel. The field averaging in Eq. (14) removes another prime, leaving only the single prime that indicates that the overall offset value for the phase is unknown. For the present purpose, this last offset value is irrelevant and disappears in Eq. (18).

Finally, for the height-independent portion of $\overline{q_v^{sys}}$ use the label $\rho_v^{sys}$:

$$\rho_v^{sys} = \overline{P_v^{sys}} \exp(i\phi_v^{sys}). \tag{19}$$

In some embodiments, $\rho_v^{sys}$ can be divided by the known theoretical part characteristics to get a more accurate value for $\rho_v^{sys}$.

Relying on the concept of separability (discussed above) and assuming that the system characterization procedure introduces no errors in magnitude or phase, the repaired frequency-domain values q of a data acquisition for an arbitrary sample part can be defined as $$q_v^{repair} = C_v^{fix} q_v \tag{20}$$

where the coefficients $C^{fix}$ are such that $$\rho_v^{target} \approx C_v^{fix} \rho_v^{sys} \tag{21}$$

and $\rho^{target}$ represents the ideal system characteristics. The goal here is to establish the complex coefficients $C_v^{fix}$ so that Eq. (21) is satisfied as nearly as possible.

To correct for system dispersion, we subtract the known system error $\phi_v^{sys}$ directly from the phase values of all subsequent measurements:

$$\arg(C_v^{fix}) = -\phi_v^{sys}. \tag{22}$$

To correct the magnitude of $C_v^{fix}$, a smoothly-apodized, symmetric target function is defined in the frequency domain, such as, for example, a raised cosine:

$$P_v^{target} = \frac{1}{2}\left[1 + \cos\left(2\pi \frac{v - v^0}{\sigma}\right)\right] \tag{23}$$

where v is the index for the frequency, $v^0$ is the peak of the target function and σ is the full width to zero=2× full width to half maximum, in units of frequency index. The value of σ follows deterministically from an analysis of the measured magnitude. For example, to match the full width at the 25% points of the target function $P^{target}$ to the full width Δv of the measured magnitude $P^{sys}$ at the same points, set $$\sigma = 1.5 \Delta v. \tag{24}$$

An example of an alternative target function is a Gaussian target function:

$$P_v^{target} = \exp\left[-\left(\frac{v - v^0}{\sigma}\right)^2\right] \tag{25}$$

for which $$\sigma = \frac{\Delta v}{2.335} \tag{26}$$

to match to the 25% of peak value points.

The next step is to determine correction coefficients that repair the magnitude of all subsequent measurements. Mathematically, this step could correspond to the decorrelation operation $$|C_v^{fix}| = \frac{P_v^{target}}{P_v^{sys}} \tag{27}$$

but this may be problematic where values of $P^{sys}$ approach zero while $P^{target}$ is still nonzero. Alternatively, one can define a coefficient for magnitude correction that places a limit on how strong the magnitude correction can be. For example, to have a maximum correction of 4× with a graceful transition to no correction, one can construct coefficients $$|C_v^{fix}| = \left[ \frac{2P_v^{target}}{P_v^{target} + P_v^{sys}/\max(P^{sys})} \right]^2. \quad (28)$$

Alternative definitions for the magnitude of $C^{fix}$ can be established according to one's experience with real data.

The correction coefficients are now $$C_v^{fix} = |C_v^{fix}| \exp(-i\phi_v^{sys}) \quad (29)$$

where Eq. (28) or some alternative approximate deconvolution defines the magnitude $|C_v^{fix}|$.

Note that the acquired doing system characterization and the experimental data should have exactly the same number of frames, so that the frequency-domain bins correspond precisely. In some embodiments, where this requirement is not met by the raw data, interpolation or extrapolation of the data can be performed prior to further analysis in order to ensure the that the system characterization and experimental data have the same number of frames.

Figure 9A:
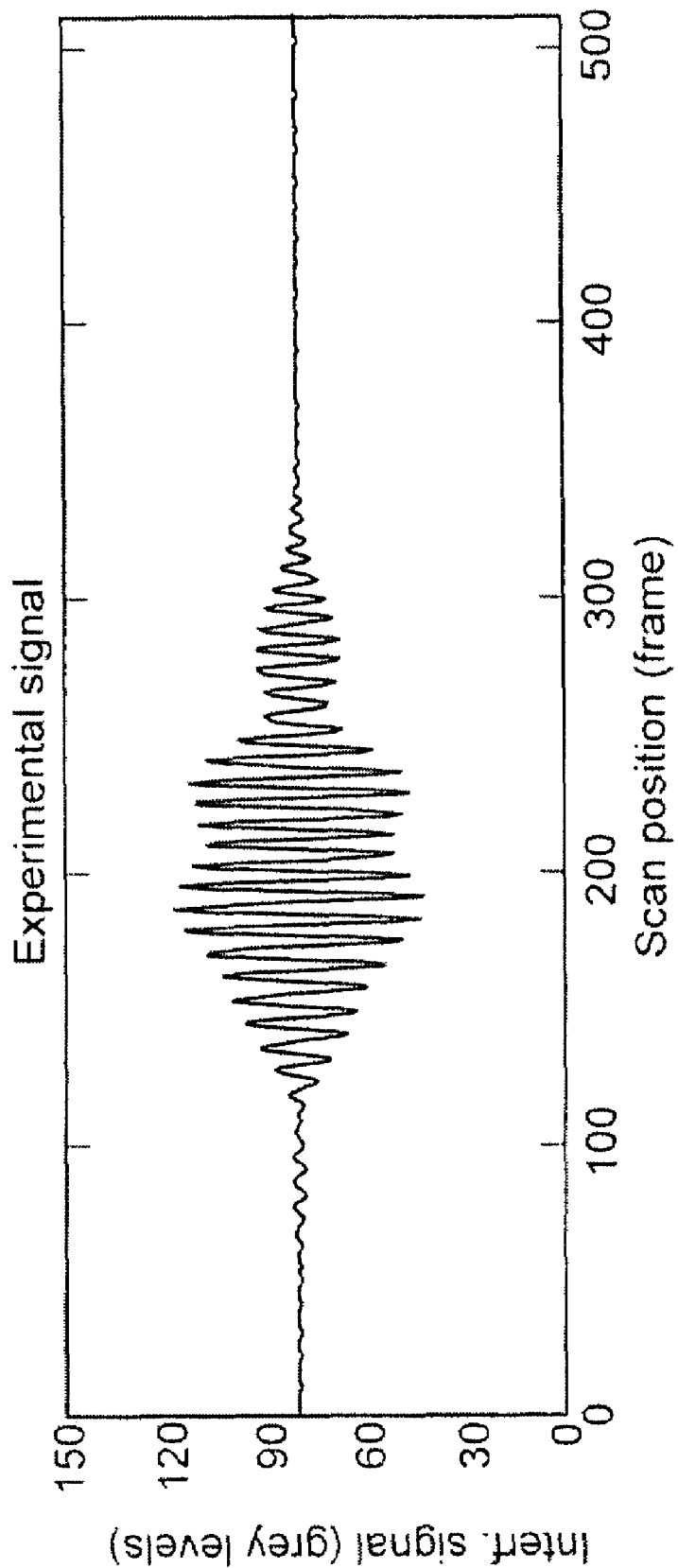
FIGS. 9A and 9B are simulated SWLI signals before and after signal repair.
Figure 9B:
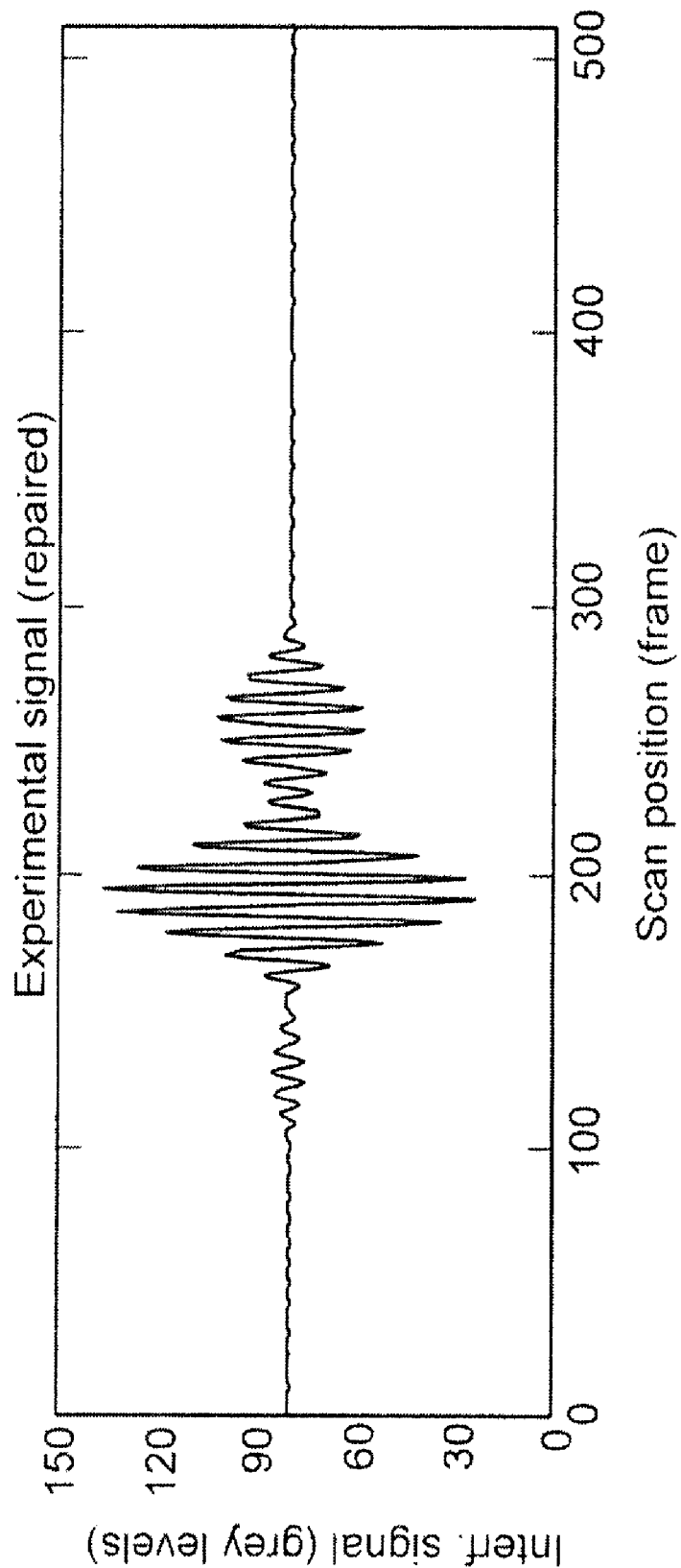

As an example, FIG. 9A shows a simulated SWLI signal for a thin-film sample (a 1510 nm thick $SiO_2$ film on a Si substrate) and an instrument afflicted by both a misshapen spectrum, as in FIG. 6A, and strong dispersion, as in FIG. 7A. The experimental signal prior to repair is distorted beyond practical use, exhibiting three coherence peaks all at the wrong places. The repaired signal, shown in FIG. 9B, is effectively the same from that of an ideal system having a perfectly Gaussian spectral distribution and zero dispersion, as shown in FIG. 6B.

Figure 10A:
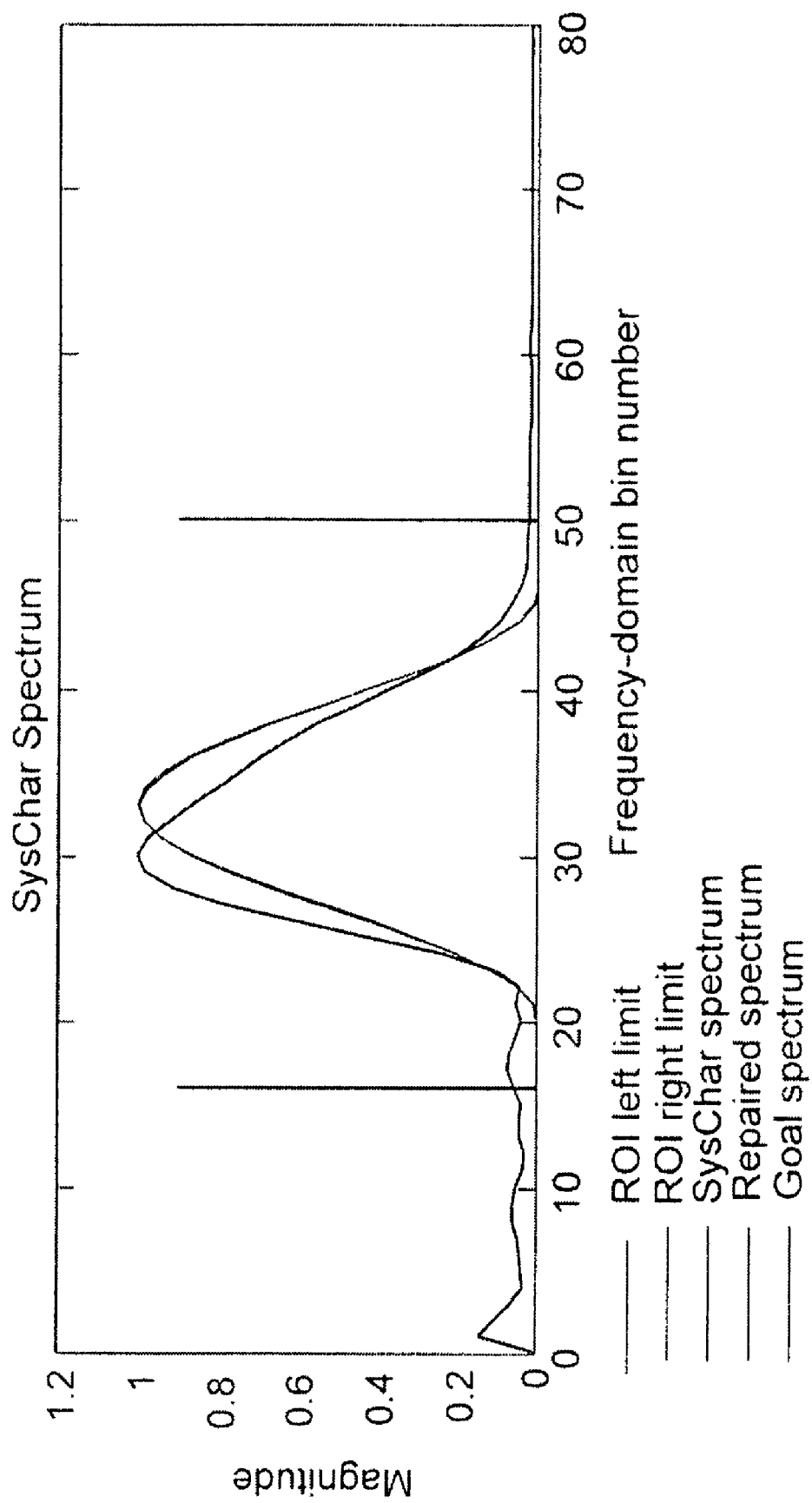
FIG. 10A is a spectral plot of a Cermax arc lamp spectrum, a model spectrum, and a repair spectrum for the Cermax arc lamp.
Figure 10B:
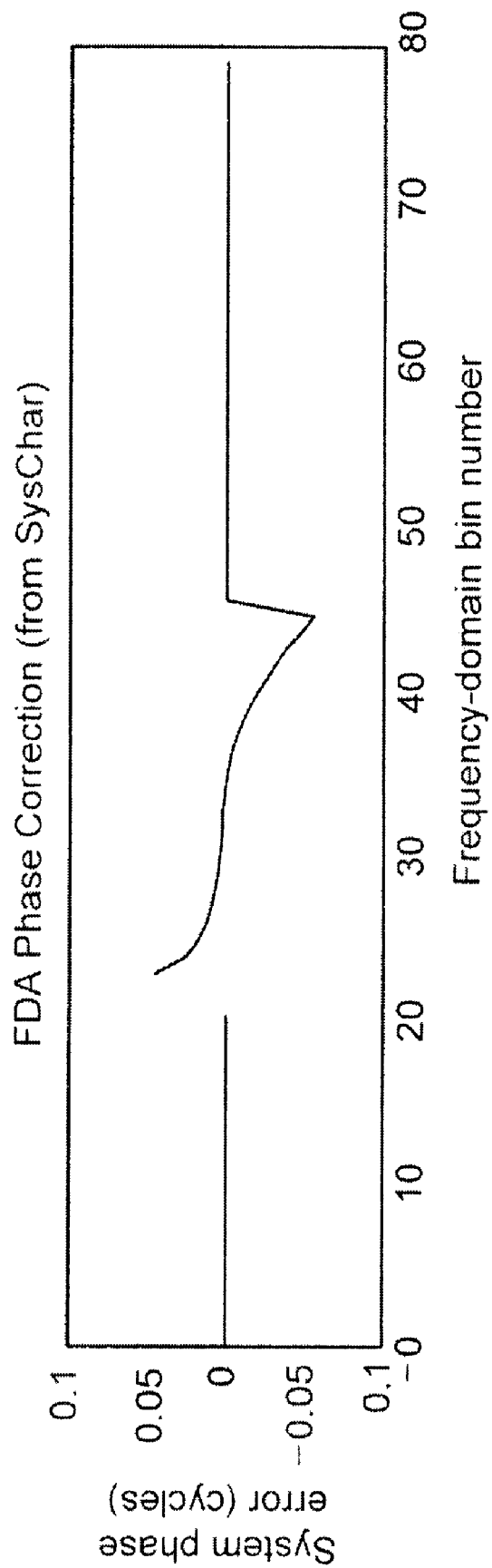
FIG. 10B shows non-linear phase dispersion for the system using the Cermax arc lamp whose spectrum is shown in FIG. 10A.

Referring to FIG. 10A, as a further example, a Cermax® arc lamp (commercially available from PerkinElmer, Freemont, Calif.) was used as an extended bandwidth light source with a Mirau interferometer. The model spectrum for the light source is indicated as GS in FIG. 10A. The system characterization spectrum, SCS, for the lamp, however, shows a lop-sided spectrum favoring low frequencies (longer wavelengths). Referring also to FIG. 10B, the system also exhibited 0.1 cycles (36°) of phase dispersion. The repaired spectrum is indicated as RS in FIG. 10A. The repaired spectrum closely matches the model spectrum. The left and right limits of the region of interest are indicated as $ROI_L$ and $ROI_R$, respectively.

Figure 11A:
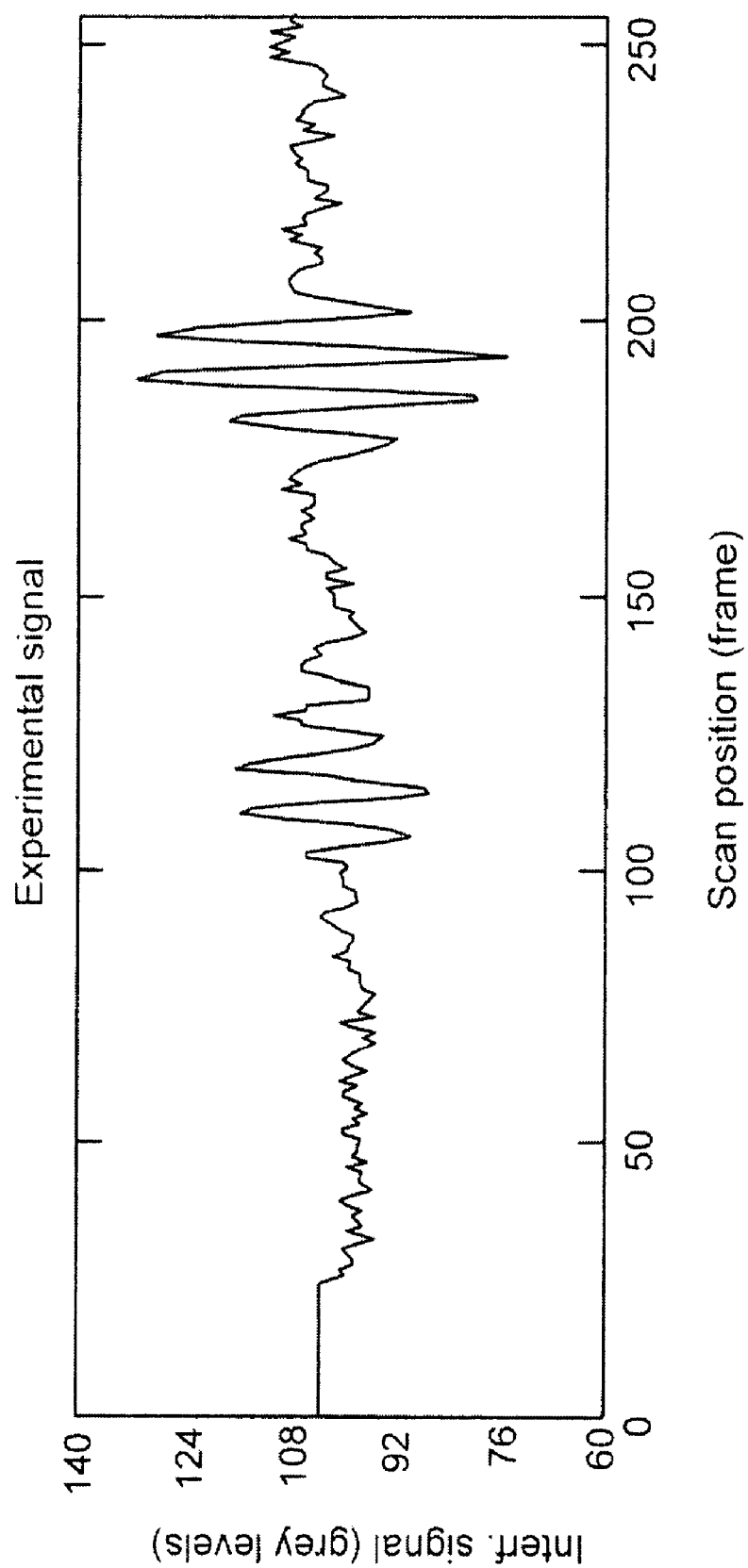
FIGS. 11A and 11B are plots of an original and repaired SWLI signal, respectively, for a sample measured using the Cermax arc lamp system referred to in FIGS. 10A and 10B.
Figure 11B:
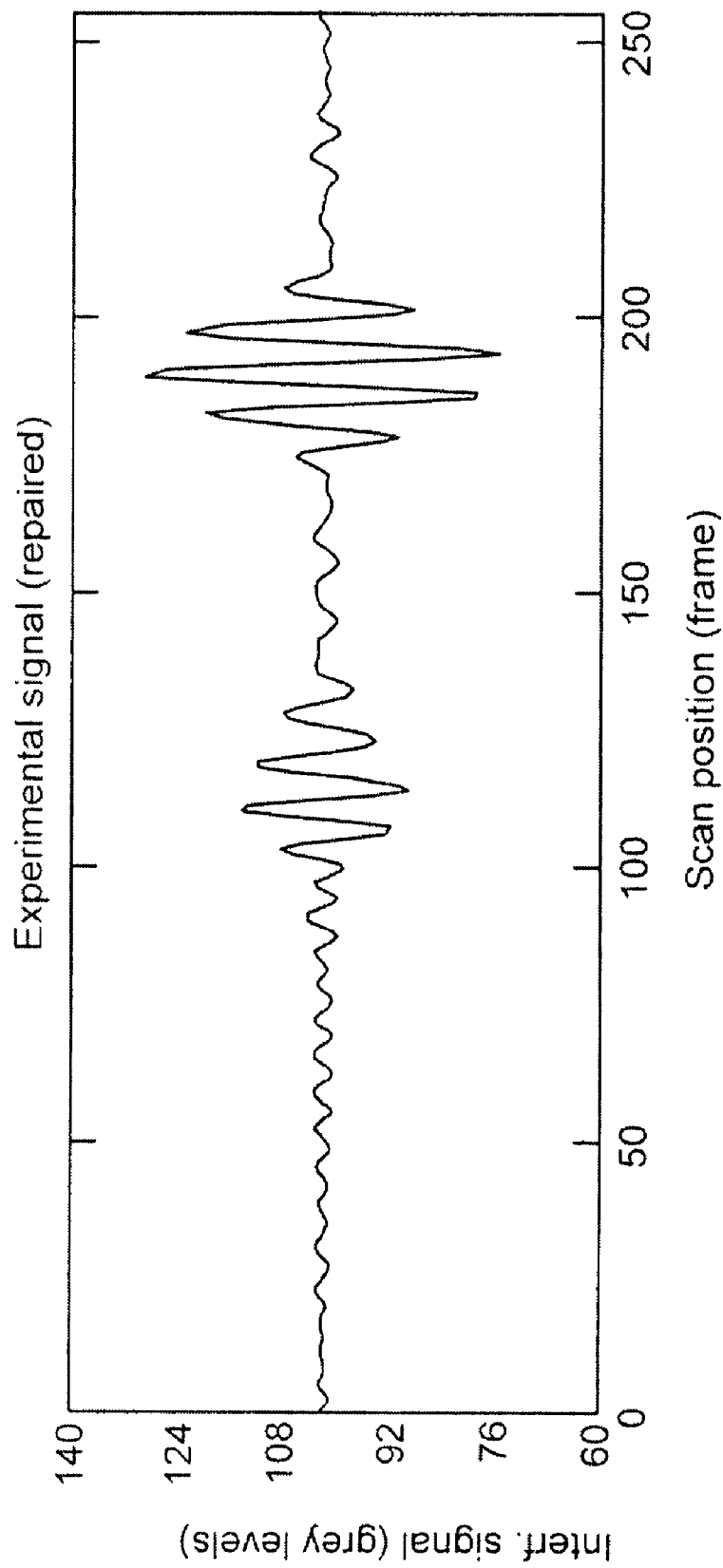
Figure 12A:
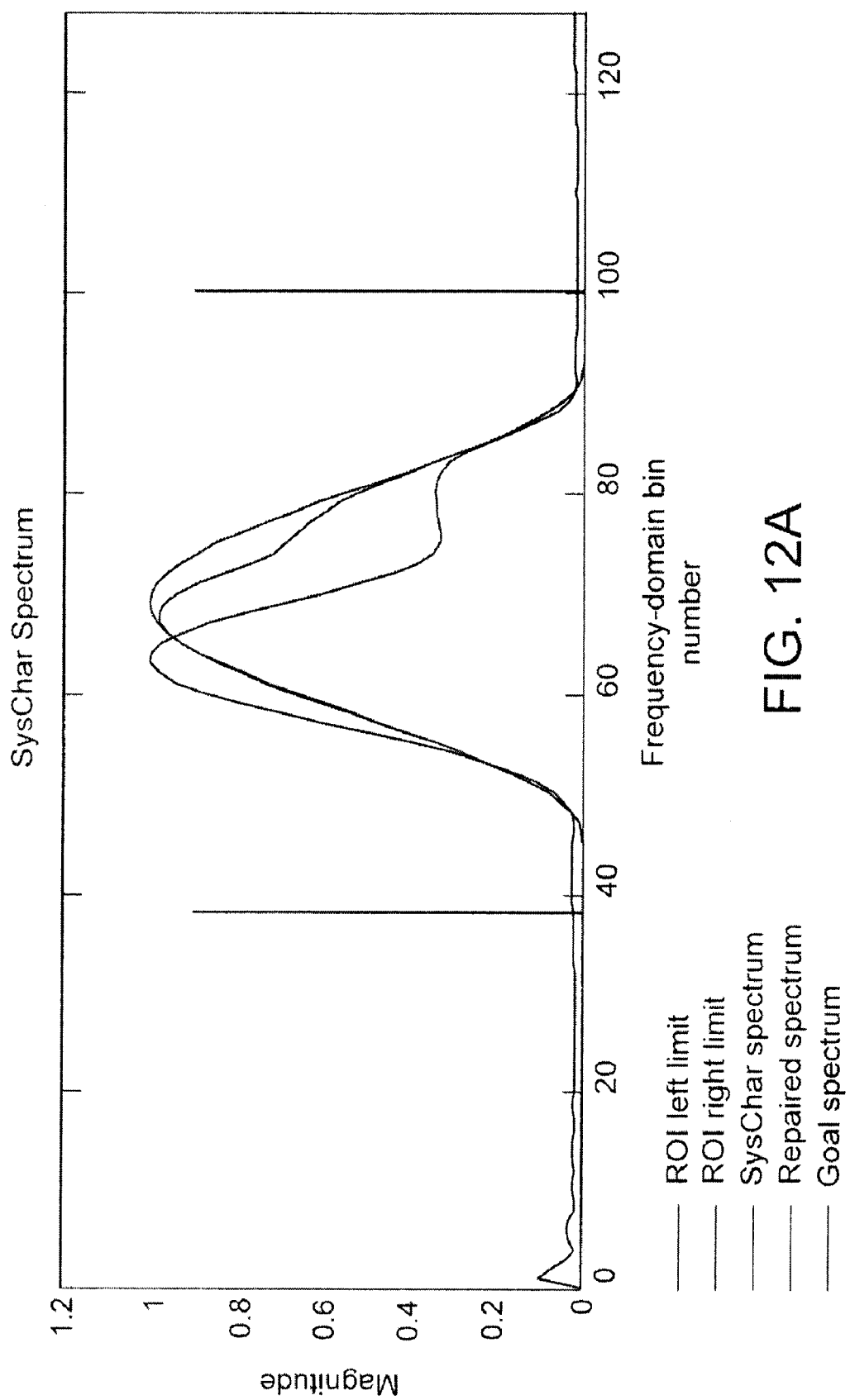
FIG. 12A is a spectral plot of a white-light light emitting diode (LED) spectrum, a model spectrum, and a repair spectrum for the white-light LED.
Figure 12B:
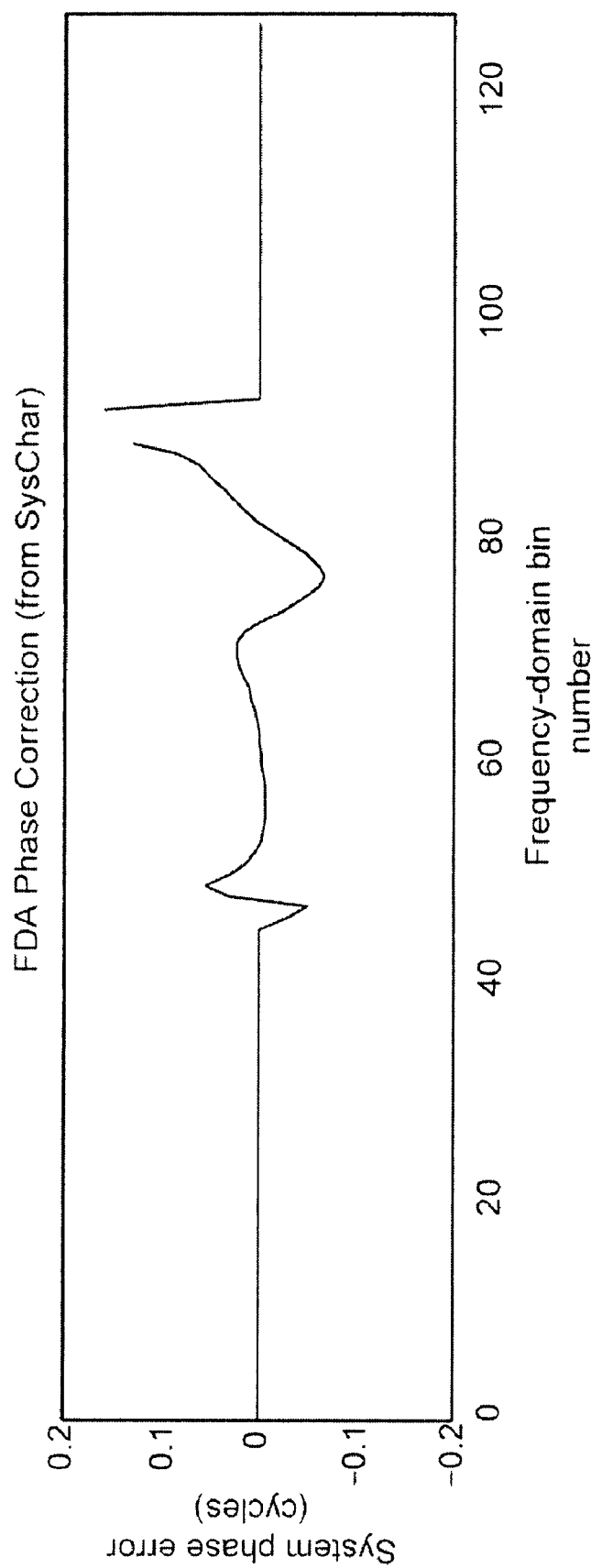
FIG. 12B shows non-linear phase dispersion for the system using the white-light LED whose spectrum is shown in FIG. 10A.

Removing the phase error, the asymmetry and the unwanted noise showed considerable improvement in the real and repaired sample data shown in FIGS. 11A and 11B, respectively, for 50× magnification.

Figure 13A:
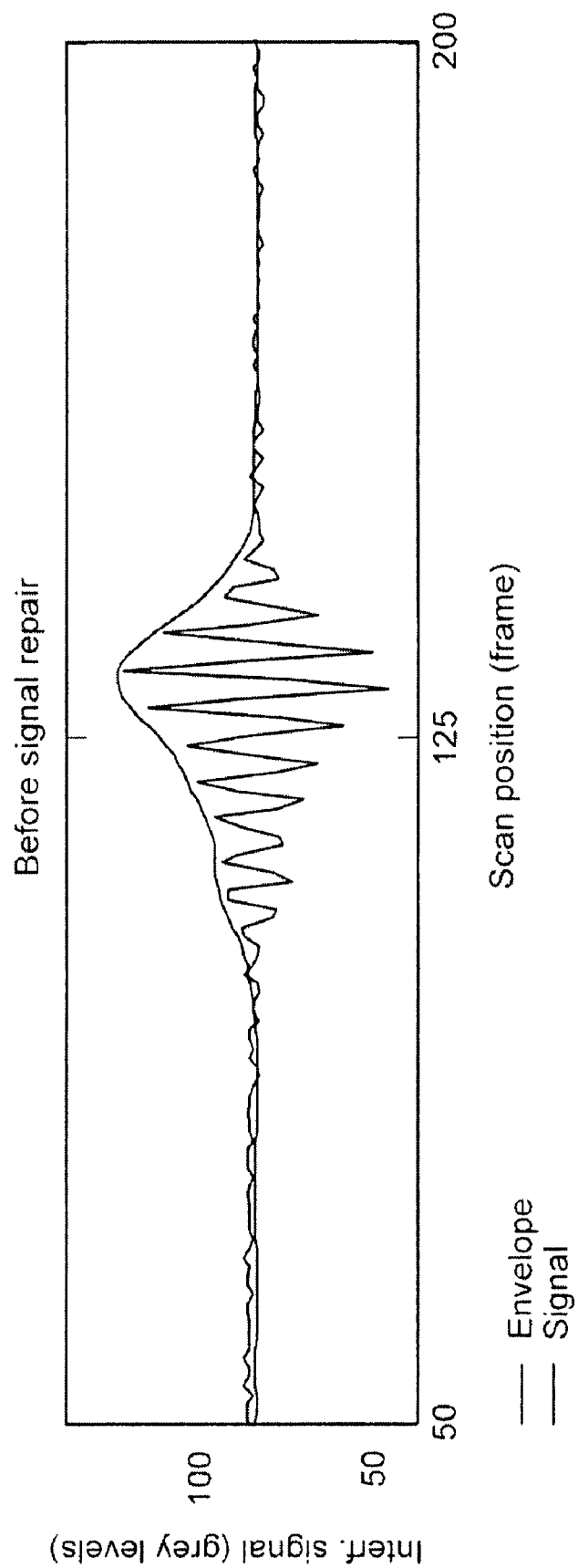
FIGS. 13A and 13B are plots of an original and repaired SWLI signal, respectively, for a sample measured using the white-light LED system referred to in FIGS. 12A and 12B.
Figure 13B:
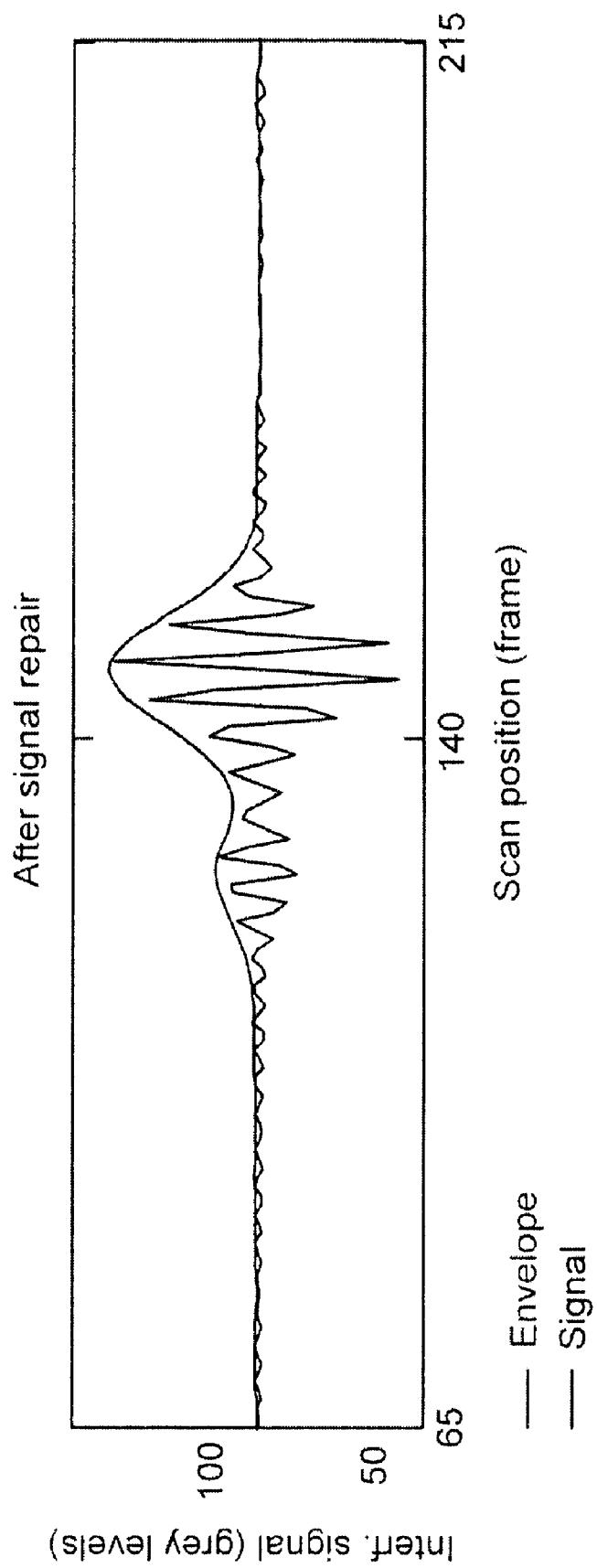
Figure 14A:
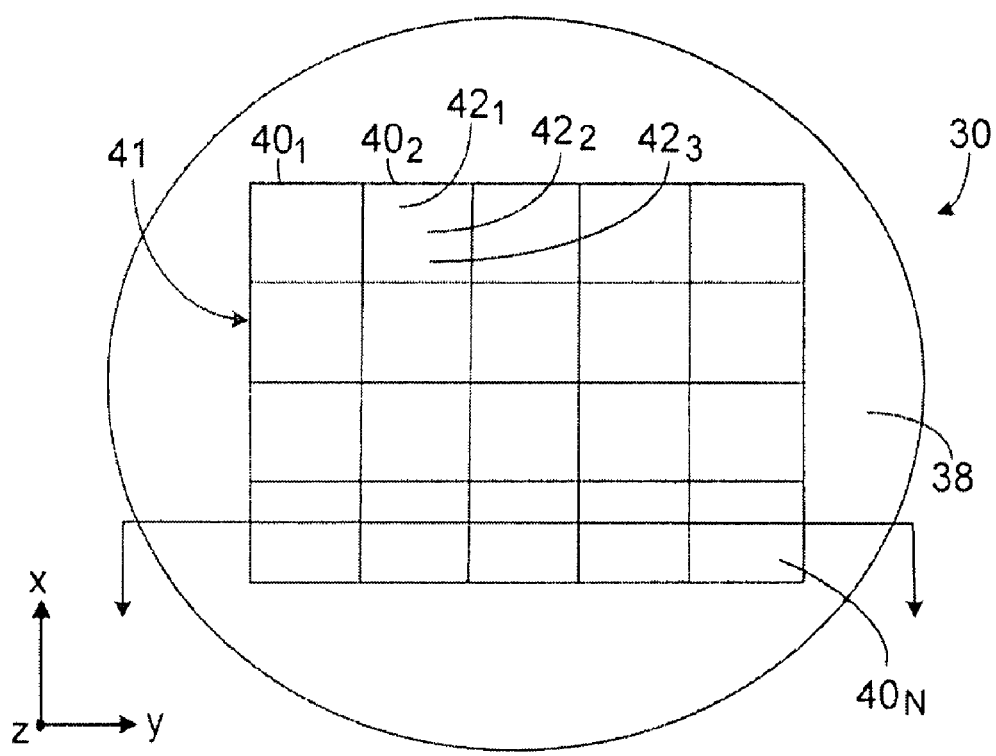
FIG. 14A is a top view of a test sample that includes a substrate and an overlying layer, e.g., a thin film.
Figure 14B:
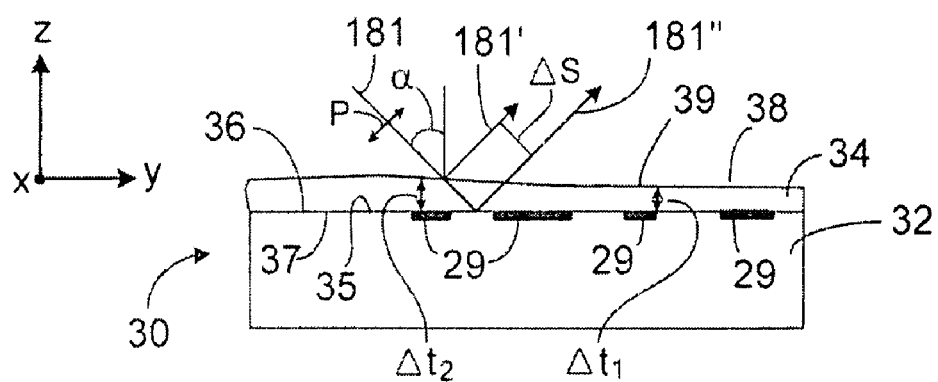
FIG. 14B is a cross-sectional view of the test sample shown in FIG. 14A.

Another candidate for an extended bandwidth light source is a light emitting diode (LED) with a blue-block filter removed. FIG. 13A shows a spectrum, SCS, for an LED. Referring also to FIG. 13B, the system using the LED also manifests significant nonlinear dispersion. The model spectrum, GS, and repaired spectrum, RS, are also shown in FIG. 13A, as are the left and right limits of the region of interest, indicated as $ROI_L$ and $ROI_R$, respectively. The signal repair affords a significant improvement as illustrated for the thin film signal in FIGS. 14A and 14B, respectively.

Further, while implementations that utilize Fourier transforms are discussed, more generally other techniques for frequency and phase analysis can be used. For example, in certain embodiments, Hilbert transforms, Wavelet transforms, and/or Lomb-Scargle analysis can be used.

In much of the analysis herein, it is assumed that the polarization state of the light in the pupil plane is random, i.e., comprised of approximately equal amounts of both s polarizations (orthogonal to the plane of incidence) and p (orthogonal to the plane of incidence) polarizations. More generally, however, other polarizations are possible, including pure s polarization, such as may be realized by means of a radial polarizer placed in the pupil plane (e.g., in the back-focal plane of the test sample in the case of a Linnik interferometer and in the back focal plane of the common objective in the Mirau interferometer). Other possible polarizations include radial p polarization, circular polarization, and modulated (e.g., two states, one following the other) polarization for ellipsometric measurements. In other words, optical properties of the test sample can be resolved not only with respect to their angle- or wavelength-dependence, but also with respect to their polarization dependence or with respect to a selected polarization. Such information may also be used to improve the accuracy of thin film structure characterization.

To provide such ellipsometry measurements, the scanning interferometry system may include a fixed or variable polarizer in the pupil plane. Referring again to FIG. 4, the Mirau interferometry system, for example, includes polarization optics 280 in the pupil plane to select a desired polarization for the light incident on, and emerging from the test sample. Furthermore, the polarization optics may be reconfigurable to vary the selected polarization. The polarization optics may include one or more elements including polarizers, waveplates, apodization apertures, and/or modulation elements for selecting a given polarization. Furthermore, the polarization optics may be fixed, structured or reconfigurable, for the purpose of generating data similar to that of an ellipsometer. For example, a first measurement with a radially-polarized pupil for s polarization, followed by a radially-polarized pupil for p polarization. In another example, one may use an apodized pupil plane with linearly polarized light, e.g., a slit or wedge, which can be rotated in the pupil plane so as to direct any desired linear polarization state to the object, or a reconfigurable screen such as a liquid crystal display.

Moreover, the polarization optics may provide a variable polarization across the pupil plane (e.g., by including multiple polarizers or a spatial modulator). Thus, one can "tag" the polarization state according to spatial frequency, for example, by providing a different polarization for high angles of incidence than shallow angles.

In certain embodiments, the selectable polarization may be combined with a phase shift as a function of polarization. For example, the polarization optics may include a linear polarizer is positioned in the pupil plane and followed by two waveplates (e.g., eighth-wave plates) in opposing quadrants of the pupil plane. The linear polarization results in a full range of polarization angles with respect to the incident planes of the objective. If the waveplates are aligned so that, for example, the predominately s-polarized light has a fixed phase shift, then both radial s polarized and p polarized light are present simultaneously, but shifted in phase with respect to each other, e.g., by $\pi$, so that the interferometer is effectively detecting the difference between these two polarization states as the fundamental signal.

In further embodiments, polarization optics may be positioned elsewhere in the apparatus. For example, linear polarization can be achieved anywhere in the system.

Any of the analysis methods described above can be implemented in computer hardware or software, or a combination of both. The methods can be implemented in computer programs using standard programming techniques following the method and figures described herein. Program code is applied to input data to perform the functions described herein and generate output information. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

In general, program outputs information generated by the analysis. For example, the information can be output to another computer (e.g., over a network), written to memory, or output to a display or printer where a user can view the information. In some embodiments, the information is output in a feedback or feedforward process (e.g., in a sample analysis application such as those described below).

EXEMPLARY APPLICATIONS

The low coherence interferometry methods and systems described above may used for any of the following surface analysis problems: simple thin films; multilayer thin films; sharp edges and surface features that diffract or otherwise generate complex interference effects; unresolved surface roughness; unresolved surface features, for example, a sub-wavelength width groove on an otherwise smooth surface; dissimilar materials; polarization-dependent properties of the surface; and deflections, vibrations or motions of the surface or deformable surface features that result in incident-angle dependent perturbations of the interference phenomenon. For the case of thin films, the variable parameter of interest may be the film thickness, the refractive index of the film, the refractive index of the substrate, or some combination thereof. Exemplary applications including objects and devices exhibit such features are discussed next.

Photolithography

Figure 15A:
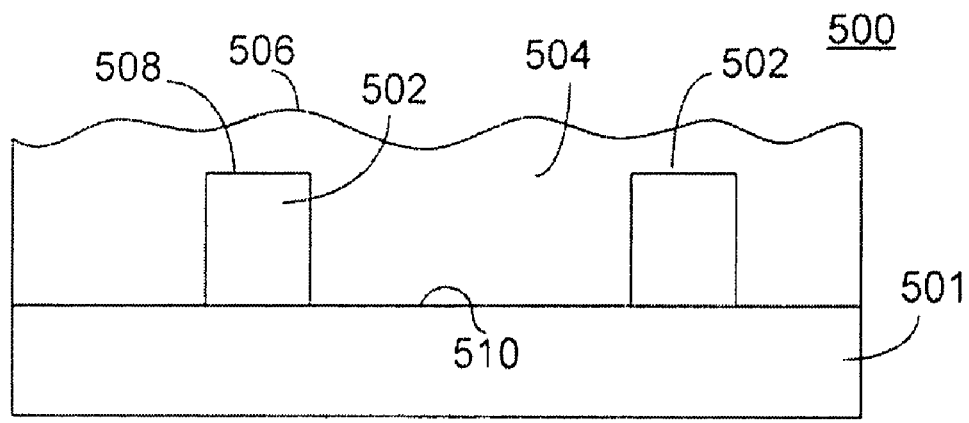
FIGS. 15A and 15B are cross-sectional views of an embodiment of a structure having copper interconnects.
Figure 15B:
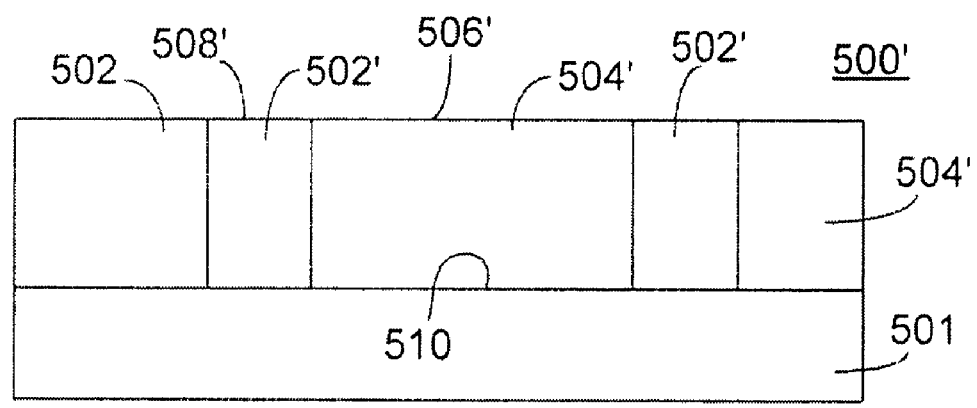

In many microelectronics applications, photolithography is used to pattern a layer of photoresist overlying a substrate, e.g., a silicon wafer. Referring to FIGS. 15A and 15B, an object 30 includes a substrate, e.g., a wafer, 32 and an overlying layer, e.g., photoresist layer 34. Object 30 includes a plurality of interfaces as occur between materials of different refractive index. For example, an object-surroundings interface 38 is defined where an outer surface 39 of photoresist layer 34 contacts the environment surrounding object 30, e.g., liquid, air, other gas, or vacuum. A substrate-layer interface 36 is defined between a surface 35 of wafer 32 and a bottom surface 37 of photoresist layer 34. Surface 35 of the wafer may include a plurality of patterned features 29. Some of these features have the same height as adjacent portions of the substrate but a different refractive index. Other features may extend upward or downward relative to adjacent portions of the substrate. Accordingly, interface 36 may exhibit a complex, varying topography underlying the outer surface of the photoresist.

A photolithography apparatus images a pattern onto the object. For example, the pattern may correspond with elements of an electronic circuit (or the negative of the circuit). After imaging, portions of the photoresist are removed revealing the substrate underlying the removed photoresist. The revealed substrate can be etched, covered with deposited material, or otherwise modified. Remaining photoresist protects other portions of the substrate from such modification.

To increase manufacturing efficiencies, more than one device is sometimes prepared from a single wafer. The devices may be the same or different. Each device requires that a subset of the wafer be imaged with a pattern. In some cases, the pattern is sequentially imaged onto different subsets. Sequential imaging can be performed for several reasons. Optical aberrations can prevent achieving adequate pattern focus quality over larger areas of the wafer. Even in the absence of optical aberrations, the spatial properties of the wafer and photoresist may also prevent achieving adequate pattern focus over large areas of the wafer. Aspects of the relationship between the spatial properties of the wafer/resist and focus quality are discussed next.

Referring to back to FIG. 15A, object 30 is shown with a number N subsets $40_i$, each smaller than a total area 41 the object to be imaged. Within each subset $40_i$, spatial property variations, e.g., height and slope variations of the wafer or photoresist, are typically smaller than when taken over the total area 41. Nonetheless, the wafer or photoresist of different subsets $40_i$ typically have different heights and slopes. For example, layer 34 exhibits thicknesses $\Delta t_1$ and $\Delta t_2$, which vary the height and slope of surface 39 (FIG. 15A). Thus, each subset of the object may have a different spatial relationship with the photolithography imager. The quality of focus is related to the spatial relationship, e.g., the distance between the object and the photolithography imager. Bringing different subsets of the object into proper focus may require relative repositioning of the object and imager. Because of the object height and slope variations, proper subset focus cannot be achieved solely by determining the position and orientation of the object with respect to a portion of the object that is remote to the imaged subset, e.g., a side 43 of the object.

Proper focus can be achieved by determining a spatial property of an object within a subset of the object to be imaged (or otherwise processed). Once the position of the subset has been determined, the object (and/or a portion of the photolithography imager) can be moved, e.g., translated, rotated, and/or tilted, to modify the position of the subset with respect to a reference, e.g., a portion of the photolithography imager. The determination and movement (if necessary) can be repeated for each subset to be imaged.

The determination of the spatial property of the subset can include determining a position and/or height of one or more points of an outer surface of a thin layer of the object, the one or more points lying within the subset of the object to be imaged. For example, the position and orientation of the outer surface 39 of subset $40_2$ (FIG. 15A) can be determined based upon the positions of points $42_1$-$42_3$ within the subset. The determination of the spatial property of the subset to be imaged can include using an interferometer to illuminate the subset with light and detecting an interference signal including light reflected from the illuminated subset. In some embodiments, a plurality of subsets are simultaneously imaged with light to obtain a plurality of interference signals. Each interference signal is indicative of one or more spatial properties of a subset. Thus, the interference signals can be used to prepare an image indicative of the topography of the object over a plurality of the subsets. During photolithography of the subsets, the wafer is positioned based upon the topography of the individual subsets as determined from the plurality of interference signals. Hence, each subset can be positioned for optimum focus with respect to the photolithography apparatus.

Detecting an interference signal from each subset of an object to be imaged can include detecting light reflected from the subset and reference light over an OPD range that is at least as large as a coherence length of the detected light. For example, the light may be detected at least over its coherence length. In some embodiments, the interferometer is configured so that the light reflected from the illuminated subset is dominated by light reflected from either an outer interface (such as outer surface 39) or an inner interface (such as interface 36). In some embodiments, a spatial property of an object is determined based on only a portion of the interference signal. For example, if the interference signal includes two or more overlapping interference patterns, a spatial property of the object can be determined based upon a portion of one of the interference patterns that is dominated by contributions from a single interface of the object.

Copper Interconnect Structures And Chemical Mechanical Polishing

It is becoming common among chip makers to use the so-called "dual damascene copper" process to fabricate electrical interconnects between different parts of a chip. This is an example of a process which may be effectively characterized using a suitable surface topography system. The dual damascene process may be considered to have six parts: (1) an interlayer dielectric (ILD) deposition, in which a layer of dielectric material (such as a polymer, or glass) is deposited onto the surface of a wafer (containing a plurality of individual chips); (2) chemical mechanical polishing (CMP), in which the dielectric layer is polished so as to create a smooth surface, suitable for precision optical lithography, (3) a combination of lithographic patterning and reactive ion etching steps, in which a complex network is created comprising narrow trenches running parallel to the wafer surface and small vias running from the bottom of the trenches to a lower (previously defined) electrically conducting layer, (4) a combination of metal deposition steps which result in the deposition of copper trenches and vias, (5) a dielectric deposition step in which a dielectric is applied over the copper trenches and vias, and (6) a final CMP step in which the excess copper is removed, leaving a network of copper filled trenches (and possibly vias) surrounded by dielectric material.

Figure 16A:
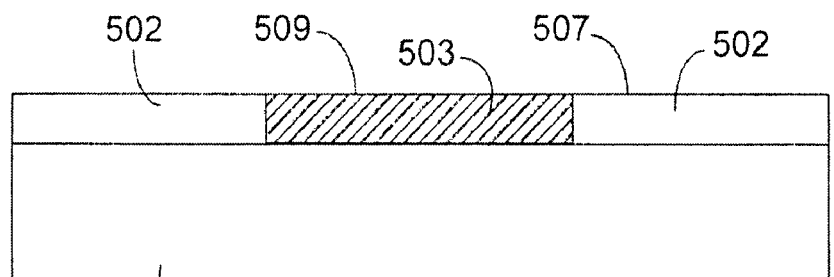
FIGS. 16A and 16B are cross-sectional views of an embodiment of a structure formed during solder bump processing.

Referring to FIG. 16A, a device 500 is exemplary of the a film structure resulting from the deposition of a dielectric 504 over copper features 502 deposited on a substrate 501. The dielectric 504 has a non-uniform outer surface 506 exhibiting height variations therealong. Interference signals obtained from device 500 can include interference patterns resulting from surface 506, an interface 508 between copper features 502 and dielectric 504, and an interface 510 between substrate 501 and dielectric 504. The device 500 may include a plurality of other features that also generate interference patterns.

Figure 16B:
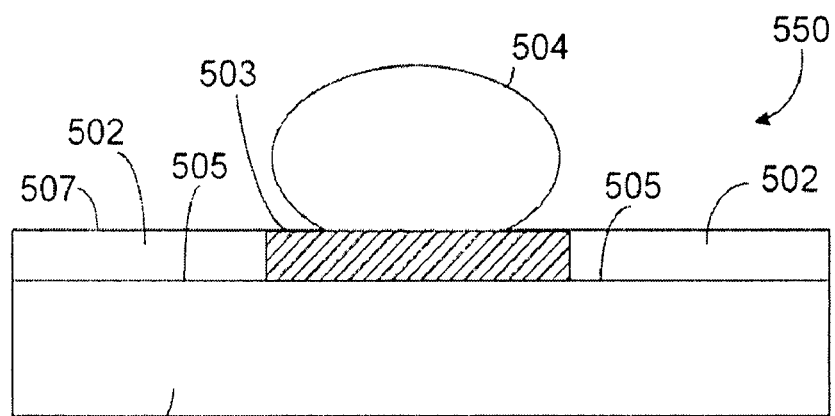

Referring to FIG. 16B, a device 500' illustrates the state of device 500 after the final CMP step. The upper surface 506 has been planarized to a surface 506', and interface 508 may now be exposed to the surroundings. Interface 510 at the substrate surface remains intact. Device performance and uniformity depends critically on monitoring the planarization of surface 504. It is important to appreciate that the polishing rate, and therefore the remaining copper (and dielectric) thickness after polishing, depends strongly and in a complex manner on the polishing conditions (such as the pad pressure and polishing slurry composition), as well as on the local detailed arrangement (i.e., orientation, proximity and shape) of copper and surrounding dielectric regions. Hence, portions of surface 506 over copper elements 502 may etch at different rates than other portions of surface 506. Additionally, once interface 508 of copper elements 502 is exposed, the dielectric and copper elements may exhibit different etch rates.

This position dependent polishing rate is known to give rise to variable surface topography on many lateral length scales. For example, it may mean that chips located closer to the edge of a wafer on aggregate are polished more rapidly than those located close to the center, creating copper regions which are thinner than desired near the edges, and thicker than desired at the center. This is an example of a 'wafer scale' process nonuniformity—i.e., one occurring on length scale comparable to the wafer diameter. It is also known that regions which have a high density of copper trenches polish at a higher rate than nearby regions with low copper line densities. This leads to a phenomenon known as 'CMP induced erosion' in the high copper density regions. This is an example of a 'chip scale' process non-uniformity—i.e., one occurring on a length scale comparable to (and sometimes much less than) the linear dimensions of a single chip. Another type of chip scale nonuniformity, known as 'dishing', occurs within single copper filled trench regions (which tend to polish at a higher rate than the surrounding dielectric material). For trenches greater than a few microns in width dishing may become severe with the result that affected lines later exhibit excessive electrical resistance, leading to a chip failure.

CMP induced wafer and chip scale process nonuniformities are inherently difficult to predict, and they are subject to change over time as conditions within the CMP processing system evolve. To effectively monitor, and suitably adjust the process conditions for the purpose of ensuring that any nonuniformities remain within acceptable limits, it is important for process engineers to make frequent non-contact surface topography measurements on chips at a large number and wide variety of locations. This is possible using embodiments of the interferometry methods and systems described above.

In some embodiments one or more spatial properties, e.g., the topography of surface 506 and/or the thickness of dielectric 504, are monitored by obtaining low coherence interference signals from the structure before and/or during CMP. Based on the spatial properties, the polishing conditions can be changed to achieve the desired planar surface 506'. For example, the pad pressure, pad pressure distribution, polishing agent characteristics, solvent composition and flow, and other conditions can be determined based on the spatial properties. After some period of polishing, the spatial property can again be determined and the polishing conditions changed as needed. The topography and/or thickness is also indicative of the end-point at which, e.g., surface 504' is achieved. Thus, the low coherence interference signals can be used to avoid depressions caused by over polishing different regions of the object. The low coherence interference methods and systems are advantageous in this respect because spatial properties of the device, e.g., the relative heights of the surface of the dielectric (a) over copper elements 502 and (b) over substrate surface 510 but adjacent copper elements 502 can be determined even in the presence of the multiple interfaces.

Solder Bump Processing

Figure 17:
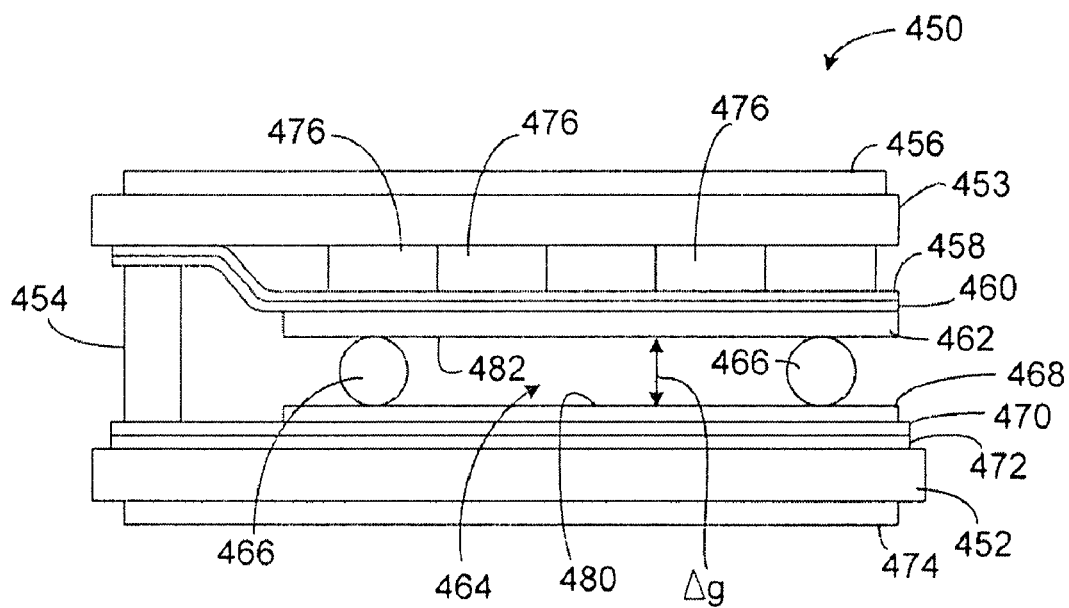
FIG. 17 is a cross-sectional view of a portion of an embodiment of a liquid crystal display.

Referring to FIGS. 17A and 17B, a structure 550 is exemplary of a structure produced during solder bump processing. Structure 550 includes a substrate 551, regions 502 non-wettable by solder, and a region 503 wettable by solder. Regions 502 have an outer surface 507. Region 503 has an outer surface 509. Accordingly, an interface 505 is formed between regions 502 and substrate 501.

During processing a mass of solder 504 is positioned in contact with wettable region 503. Upon flowing the solder, the solder forms a secure contact with the wettable region 503. Adjacent non-wettable regions 502 act like a dam preventing the flowed solder from undesirable migration about the structure. It is desirable to know spatial properties of the structure including the relative heights of surfaces 507, 509 and the dimensions of solder 504 relative to surface 502. As can be determined from other discussions herein, structure 550 includes a plurality of interfaces that may each result in an interference pattern. Overlap between the interference patterns prevents accurate determinate of the spatial properties using known interference techniques. Application of the systems and methods discussed herein allow the spatial properties to be determined.

Spatial properties determined from structure 550 can be used to change manufacturing conditions, such as deposition times for layers 502, 503 and the amount of solder 504 used per area of region 503. Additionally, heating conditions used to flow the solder can also be changed based on the spatial properties to achieve adequate flow and or prevent migration of the solder.

Liquid Crystal Displays

Referring to FIG. 18, a passive matrix LCD 450 is composed of several layers. The main parts are two glass plates 452, 453 connected by seals 454. A polarizer 456 is applied to the front glass plate 453 in order to polarize incoming light in a single direction. The polarized light passes through the front glass plate 453. An Indium Tin Oxide (ITO) layer 458 is used as an electrode. A passivation layer 460, sometimes called hard coat layer, based on $SiO_x$ is coated over the ITO 458 to electrically insulate the surface. Polyimide 462 is printed over the passivation layer 460 to align the liquid crystal fluid 464. The liquid crystal fluid is sensitive to electric fields and changes orientation when an electric field is applied. The liquid crystal is also optically active and rotates the polarization direction of the incoming light. The cell gap $\Delta g$, i.e., thickness of the liquid crystal layer 464, is determined by spacers 466, which keep the two glass plates 452, 453 at a fixed distance. When there is no electric potential from the front plate 453 to the rear plate 452, the polarized light is rotated 90° as it passes through the liquid crystal layer 464. When an electric potential is applied from one plate to the other plate the light is not rotated. After the light has passed through the liquid crystal layer 464, it passes through another polyimide layer 468, another hard coat layer 470, a rear ITO electrode 472, and the rear glass plate 452. Upon reaching a rear polarizer 474, the light either transmitted through or absorbed, depending on whether or not it has been rotated 90°. The cell 450 may include filters 476 or other colorizing elements to provide a color display.

The cell gap $\Delta g$ determines to a great extent the optoelectrical properties of the LCD, e.g., the contrast ratio and brightness. Cell gap control during manufacturing is critical to obtaining uniform, quality displays. The actual cell gap may differ from the dimensions of spacers 466 because, during assembly, pressure or vacuum is applied to introduce the liquid crystal medium, seals 454 cure and may change dimensions, and the added liquid crystal medium generates capillary forces between plates 452, 453. Both before and after adding the liquid crystal medium 464, surfaces 480, 482 of plates 452, 453 reflect light that results in an interference pattern indicative of the cell gap $\Delta g$. The low coherence nature of the interference signal either itself or in combination with the described interference signal processing techniques can be used to monitor properties of the cell including the cell gap $\Delta g$ during manufacture even in the presence of interfaces formed by other layers of the cell.

An exemplary method can include obtaining a low coherence interference signal including interference patterns indicative of the cell gap $\Delta g$ prior to adding layer 464. The cell gap (or other spatial property of the cell) is determined from the interference patterns and can be compared to a specified value. Manufacturing conditions, e.g., a pressure or vacuum applied to plates 452, 453 can be changed to modify the cell gap $\Delta g$ if a difference between the specified value and the determined cell gap exceeds tolerances. This process can be repeated until achieving the desired cell gap. Liquid crystal medium is then introduced into the cell. The amount of liquid crystal medium to be added can be determined from the measured spatial property of the cell. This can avoid over- or underfilling the cell. The filling process can also be monitored by observing interference signals from the surfaces 480, 482. Once the cell has been filed, additional low coherence interference patterns are obtained to monitor the cell gap $\Delta g$ (or other spatial property). Again, the manufacturing conditions can be changed so that the cell gap is maintained or brought within tolerances.

Laser Scribing and Cutting

Lasers can be used to scribe objects in preparation for separating different, concurrently manufactured structures, e.g., microelectronics structures. The quality of separation is related to the scribing conditions, e.g., laser focus size, laser power, translation rate of the object, and scribe depth. Because the density of features of the structure may be large, the scribe lines may be adjacent thin film or layers of the structures. Interfaces associated with the thin film or layers may create interference patterns that appear when interferometry is used to determine the scribe depth. The methods and systems described herein can be used to determine the scribe depth even in the presence of such adjacent films or layers.

An exemplary method can include scribing one or more electronic structures and separating the structures along the scribe lines. Before and/or after separation, low coherence interference signals can be used to determine the depth of scribe. Other scribing conditions are known, e.g., laser spot size, laser power, translation rate. The scribe depth can be determined from the interference signals. The quality of separation as a function of the scribing conditions, including the scribe depth, can be determined by evaluating the separated structures. Based on such determinations, the scribing conditions necessary to achieve a desired separation quality can be determined. During continued manufacturing, low coherence interference signals can be obtained from scribed regions to monitor the process. Scribing conditions can be changed to maintain or bring the scribe properties within tolerances.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
    transforming test interferometry data acquired for a test sample using a low coherence imaging interferometry system to a frequency domain;
    providing calibration information comprising a correction coefficient for each of a plurality of frequencies in the frequency domain, where each correction coefficient is based on a variation between calibration interferometry data acquired for a calibration sample using the low coherence imaging interferometry system and model interferometry data corresponding to interferometry data acquired for the calibration sample using a model interferometry system, where the model interferometry system corresponds to a low coherence interferometry system with reduced imperfections; and at each of the plurality of frequencies in the frequency domain, using the corresponding correction coefficient to modify the test interferometry data, thereby producing compensated interferometry data, wherein the compensated interferometry data corresponds to interferometry data that would be acquired for the test sample using the model interferometry system.

2. The method of claim 1, wherein the imperfections in the interferometry system comprise deviations of an output spectrum of a light source of the interferometry system from a model spectrum of the model interferometry system.

3. The method of claim 2, wherein the model spectrum corresponds to an analytic function.

4. The method of claim 3, wherein the analytic function comprises a Gaussian function or a raised cosine function.

5. The method of claim 1, wherein the imperfections in the interferometry system comprise imperfections in optical components in the interferometry system.

6. The method of claim 5, wherein the imperfections in the optical components result in non-linear dispersion in the light used by the low coherence interferometry system.

7. The method of claim 1, wherein the test interferometry data is transformed to the frequency domain using a Fourier transform.

8. The method of claim 7, wherein the transformed interferometry data is characterized by a Fourier coefficient at each of the plurality of frequencies and modifying the test interferometry data comprises changing the phase of the Fourier coefficient based on the correction coefficient at one or more of the plurality of frequencies.

9. The method of claim 7, wherein the transformed interferometry data is characterized by a Fourier coefficient at each of the plurality of frequencies and modifying the test interferometry data comprises changing the magnitude of the Fourier coefficient based on the correction coefficient at one or more of the plurality of frequencies.

10. The method of claim 1, wherein the test interferometry data is acquired simultaneously for a plurality of locations of the test sample using a detector array.

11. The method of claim 1, wherein the test sample comprises a thin film supported by a substrate.

12. The method of claim 11, wherein the substrate is a semiconductor substrate.

13. The method of claim 1, wherein the calibration sample is a SiC calibration sample.

14. The method of claim 1, further comprising determining information about the test sample from the compensated interferometry data.

15. The method of claim 14, wherein determining information about the test sample comprises transforming the compensated interferometry data into a scan domain and analyzing the compensated interferometry data in the scan domain.

16. The method of claim 14, wherein determining information about the test sample comprises analyzing the compensated interferometry data in the frequency domain.

17. The method of claim 14, further comprising outputting the information about the test sample.

18. The method of claim 17, wherein outputting the information comprises displaying the information or writing the information to memory.

19. The method of claim 14, wherein the information about the test sample comprises information about a surface of the test sample.

20. The method of claim 19, wherein the information about the surface comprises a profile of the surface.

21. The method of claim 14, wherein the test sample comprises a first portion of a first material and a second portion of a second material and the information about the test sample comprises information about an interface between the first and second portions.

22. The method of claim 14, wherein the test sample comprises a film of a material having a thickness of about 10 μm or less and the information about the test sample comprises a profile of the film's thickness.

23. The method of claim 22, wherein the film has a thickness of about 0.5 μm or less.

24. A system, comprising:
a low coherence light source;
an imaging interferometer configured to receive light from the light source, to direct a portion of the light to reflect from a test sample, to direct another portion of the light to reflect from a reference object, and to combine the light reflected from the measurement and reference objects to produce an output beam;
a detector configured to detect the output beam and to produce an interference signal comprising information about the test sample; and
an electronic processor in communication with the detector, the electronic processor being configured to transform test interferometry data derived from the interference signal to a frequency domain and, at each of the frequencies in the frequency domain, modify the test interferometry data to produce compensated interferometry data,
wherein the electronic processor modifies the test interferometry data based on calibration information comprising a correction coefficient for each of the freciuencies, where each correction coefficient is based on a variation between calibration interferometry data acquired for a calibration sample using the system and model interferometry data corresponding to interferometry data acquired for the calibration sample using a model interferometry system, where the model interferometry system corresponds to a system having reduced imperfections, and the compensated interferometry data corresponds to interferometry data that would be acquired for the test sample using the model interferometry system.

25. The system of claim 24, wherein the model interferometry system has reduced imperfections in the imaging interferometer or the light source.

26. The system of claim 25, wherein the model interferometry system has reduced imperfections in both the imaging interferometer and the light source.

27. The system of claim 25, wherein the imperfections in the light source comprise deviations of the source spectrum from a model spectrum.

28. The system of claim 25, wherein the model spectrum corresponds to an analytic function.

29. The system of claim 28, wherein the analytic function comprises a Gaussian function or a raised cosine function.

30. The system of claim 24, wherein the imperfections in the imaging interferometer comprise nonlinear dispersion in the interferometer.

31. The system of claim 24, wherein the light source has an output spectrum having a full width at half maximum (FWHM) of about 50 nm or more.

32. The system of claim 31, wherein the output spectrum has a FWHM of about 100 nm or more.

33. The system of claim 24, wherein the light source comprises a light emitting diode or an arc lamp.

34. The system of claim 24, wherein light from the light source is in the visible portion of the electromagnetic spectrum.

35. The system of claim 24, wherein the interferometer is a Mirau interferometer.

36. The system of claim 24, wherein the interferometer is a Linnik interferometer.

37. The system of claim 24, wherein the interferometer has a numerical aperture at the object of about 0.1 or more.

38. The system of claim 37, wherein the interferometer has a numerical aperture at the object of about 0.3 or more.

* * * * *

UNITED STATES PATENT AND TRADEMARK OFFICE
CERTIFICATE OF CORRECTION

PATENT NO. : 7,522,288 B2
APPLICATION NO. : 11/780177
DATED : April 21, 2009
INVENTOR(S) : Peter J. De Groot Page 1 of 1

It is certified that error appears in the above-identified patent and that said Letters Patent is hereby corrected as shown below:

In claim 24, column 26, line 40, delete "freciuencies," and insert --frequencies,--.

Signed and Sealed this

Twenty-third Day of June, 2009

JOHN DOLL
*Acting Director of the United States Patent and Trademark Office*